US012257626B2

(12) United States Patent
Lock et al.

(10) Patent No.: US 12,257,626 B2
(45) Date of Patent: Mar. 25, 2025

(54) DEVICES, SYSTEMS, AND METHODS FOR CALIBRATING AND MAINTAINING A TEMPERATURE OF MATERIALS IN AN ADDITIVE MANUFACTURING BUILD CHAMBER

(71) Applicant: ARCAM AB, Mölnlycke (SE)

(72) Inventors: Tomas Lock, Laholm (SE); Björn Löfving, Kärna (SE)

(73) Assignee: Arcam AB, Mölnlycke (SE)

( * ) Notice: Subject to any disclaimer, the term of this patent is extended or adjusted under 35 U.S.C. 154(b) by 691 days.

(21) Appl. No.: 17/348,312

(22) Filed: Jun. 15, 2021

(65) Prior Publication Data

US 2022/0395904 A1  Dec. 15, 2022

(51) Int. Cl.
| | |
|---|---|
| B22F 10/31 | (2021.01) |
| B22F 10/80 | (2021.01) |
| B22F 12/41 | (2021.01) |
| B23K 15/00 | (2006.01) |
| B33Y 30/00 | (2015.01) |
| B33Y 50/00 | (2015.01) |
| G01J 5/00 | (2022.01) |
| G01J 5/20 | (2006.01) |
| G01N 25/02 | (2006.01) |
| G01N 25/04 | (2006.01) |
| G01N 25/72 | (2006.01) |

(52) U.S. Cl.
CPC ............. *B22F 10/31* (2021.01); *B22F 10/80* (2021.01); *B22F 12/41* (2021.01); *B23K 15/0013* (2013.01); *B23K 15/0026* (2013.01); *B23K 15/0086* (2013.01); *B33Y 30/00* (2014.12); *B33Y 50/00* (2014.12); *G01J 5/0003* (2013.01); *G01J 5/20* (2013.01); *G01N 25/02* (2013.01); *G01N 25/04* (2013.01); *G01N 25/72* (2013.01); *G01J 2005/202* (2013.01)

(58) Field of Classification Search
CPC .......... B22F 10/31; B22F 12/41; B22F 10/80; B33Y 30/00; B33Y 50/00; B23K 15/0013; B23K 15/0026; B23K 15/0086; G01J 5/0003; G01J 5/20; G01J 2005/202
USPC ....................................................... 219/76.1
See application file for complete search history.

(56) References Cited

U.S. PATENT DOCUMENTS

| | | | | | |
|---|---|---|---|---|---|
| 3,997,853 | A | * | 12/1976 | Morris | ...................... H01S 3/16 372/41 |
| 5,226,732 | A | * | 7/1993 | Nakos | .................... G01J 5/0808 374/126 |

(Continued)

OTHER PUBLICATIONS

U.S. Pat. No. 406,613, entitled "Non-Reversing Stop" and filed on Dec. 16, 1907, which issued as U.S. Pat. No. 925,715 on Jun. 22, 1909 (Copy Attached).

*Primary Examiner* — Thien S Tran
*Assistant Examiner* — Simpson A Chen
(74) *Attorney, Agent, or Firm* — Dinsmore & Shohl LLP

(57) ABSTRACT

Devices, systems, and methods for calibrating for an electron beam additive manufacturing system. The electron beam manufacturing system includes electron beam guns. A calibration system includes an optical pyrometer. The optical pyrometer captures thermal radiation emitted from raw material. An analysis component is communicatively coupled to the optical pyrometer. The analysis component is programmed to determine calibration parameters from information from the optical pyrometer and a phase transition temperature.

19 Claims, 8 Drawing Sheets

(56) References Cited

U.S. PATENT DOCUMENTS

| | | | |
|---|---|---|---|
| 5,698,273 | A | 12/1997 | Azad et al. |
| 8,878,094 | B2 | 11/2014 | Bagavath-Singh |
| 9,044,827 | B2 | 6/2015 | Song et al. |
| 9,533,375 | B2 | 1/2017 | Cho et al. |
| 2006/0171442 | A1* | 8/2006 | Volf .................... G01J 5/53 374/1 |
| 2010/0032414 | A1* | 2/2010 | Arjakine ............ B23K 15/0086 219/75 |
| 2013/0179094 | A1* | 7/2013 | Valley .................... G06F 17/10 702/35 |
| 2016/0185048 | A1* | 6/2016 | Dave ...................... B33Y 50/02 700/119 |
| 2019/0188346 | A1 | 6/2019 | Mirabella et al. |
| 2019/0232427 | A1 | 8/2019 | Roychowdhury et al. |
| 2019/0323111 | A1 | 10/2019 | Carter et al. |
| 2020/0086388 | A1* | 3/2020 | Zediker ................ B23K 26/032 |
| 2020/0110025 | A1* | 4/2020 | Yacoubian ......... G01N 21/4788 |
| 2022/0324026 | A1* | 10/2022 | Beckett ................. B33Y 50/02 |

\* cited by examiner

DEVICES, SYSTEMS, AND METHODS FOR CALIBRATING AND MAINTAINING A TEMPERATURE OF MATERIALS IN AN ADDITIVE MANUFACTURING BUILD CHAMBER

FIELD

The present disclosure relates to devices, systems, and methods for calibrating thermal sensors in an additive manufacturing system, and more specifically, for calibrating the thermal sensors utilizing a predetermined phase transition temperature of a raw material.

BACKGROUND

In additive manufacturing processes, particularly those that utilize electron emitters to melt a powder layer to create an article, it may be necessary to measure heat of the powder layer to ensure that the powder layer is melted to a proper temperature. The high levels of heat may make measuring temperature difficult. Further, thermal sensors may be subject to inaccuracies and drift.

SUMMARY

Disclosed herein is a calibration system for an electron beam additive manufacturing system including one or more electron beam guns. The calibration system includes an optical pyrometer positioned to capture thermal radiation emitted from raw material disposed on a surface within a build chamber of the electron beam additive manufacturing system; and an analysis component communicatively coupled to the optical pyrometer. The analysis component is programmed to receive first thermal data corresponding to the thermal radiation of a first target area of raw material after the first target area has been heated to a predetermined melting temperature associated with the raw material and at least until the first target area solidifies at a predetermined phase transition temperature associated with the raw material. Further, the analysis component is programed to determine one or more calibration parameters from the first thermal data and the predetermined phase transition temperature, and transmit one or more instructions to the optical pyrometer in accordance with the one or more calibration parameters.

Further disclosed is an electron beam additive manufacturing system, including a build chamber at least one electron beam gun configured to emit an electron beam within the build chamber; and a calibration system. The calibration system includes an optical pyrometer positioned to capture thermal radiation emitted from raw material disposed on a surface within the build chamber; and an analysis component communicatively coupled to the optical pyrometer and programmed to receive first thermal data corresponding to the thermal radiation of a first target area of raw material after the first target area has been heated to a predetermined melting temperature associated with the raw material and at least until the first target area solidifies at a predetermined phase transition temperature associated with the raw material, determine one or more calibration parameters from the first thermal data and the predetermined phase transition temperature, transmit one or more instructions to the optical pyrometer in accordance with the one or more calibration parameters, and transmit one or more instructions to the at least one electron beam gun in accordance with the one or more calibration parameters.

Further disclosed herein is a method of calibrating an additive manufacturing system. The method including heating a first target area of a raw material disposed on a build platform to a target temperature above a predetermined melting temperature of the raw material via a heat source, the raw material having a predetermined composition and a predetermined phase transition temperature. The method further includes in response to the first target area forming a first melt puddle, terminating the heating; capturing, via an optical pyrometer, first thermal data of the first melt puddle as the first melt puddle transitions from a liquid to a solid; in response to the first melt puddle transforming to a solid, determining a first arrest period temperature metric based on the first thermal data and the predetermined phase transition temperature; and adjusting the optical pyrometer based on the first arrest period temperature metric.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and in the claims, the singular form of "a", "an", and "the" include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
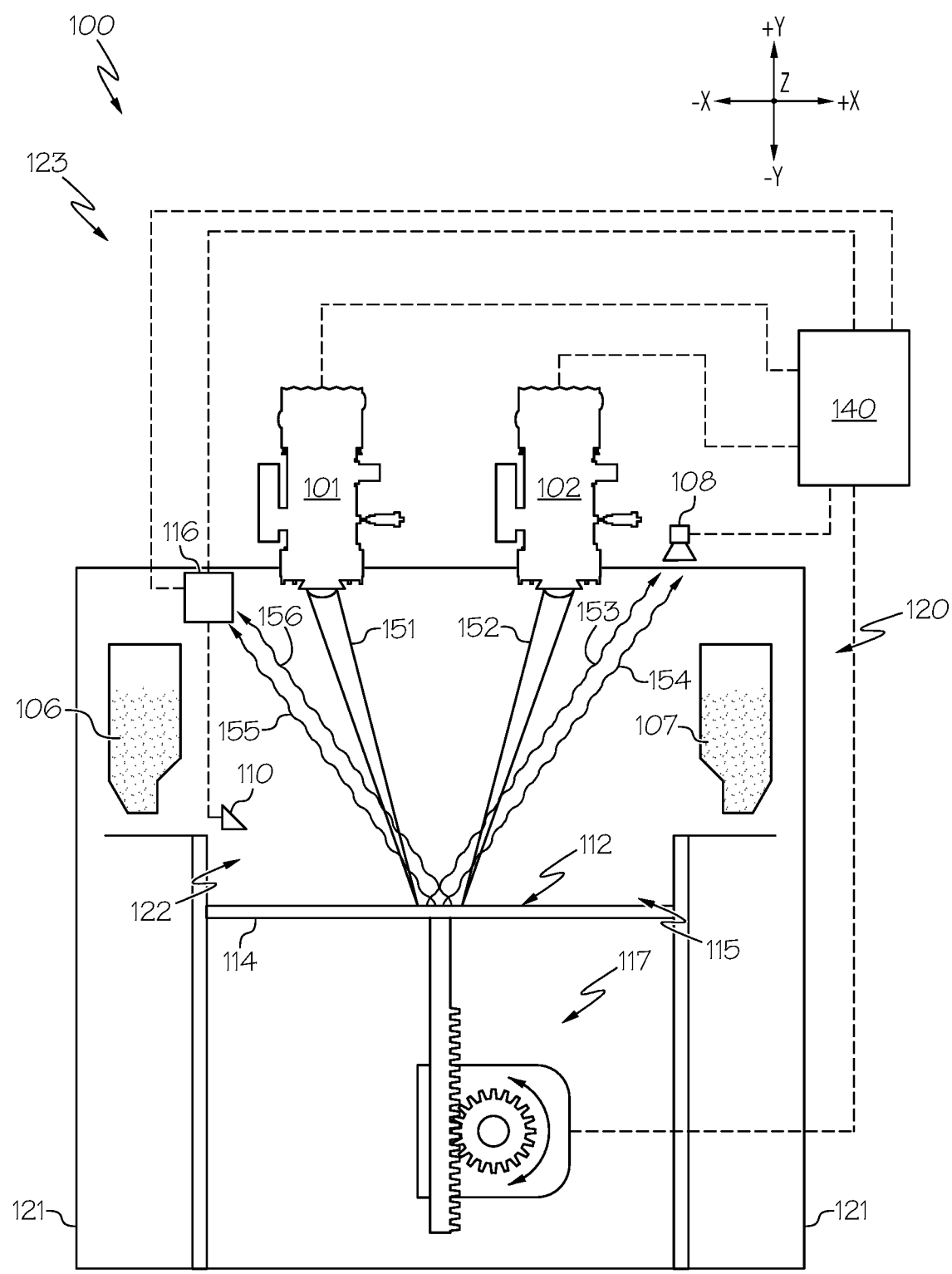
FIG. 1 schematically depicts a cutaway side view of an illustrative additive manufacturing system including a plurality of electron beam emitters, an imaging device, and a thermal sensor device according to one or more embodiments shown and described herein.

The present disclosure generally relates to devices, systems, and methods that allow for calibrating an optical pyrometer positioned to capture thermal radiation emitted from raw material disposed on a surface within a build chamber of an additive manufacturing system, which may include an electron beam system, laser systems, or other additive manufacturing systems. The optical pyrometer may include a single point optical pyrometer that, for instance, measures heat emitted from raw material utilized for forming an additive manufacturing part. The optical pyrometer may be communicatively coupled to an analysis component that may calibrate the optical pyrometer and may receive measurements from the optical pyrometer to control one or more heat sources, such as electron beam guns arranged and configured to heat raw material.

According to embodiments, the optical pyrometer may be calibrated by an analysis component communicatively coupled to the optical pyrometer before, during, or after a raw material is heated by the heat source. For instance, a heat source may heat a small, targeted area of raw material until the targeted area forms a melt puddle and substantially reaches a predetermined melting temperature known for the raw material. The heat source may terminate heating and the optical pyrometer measures the temperature while the melt puddle cools and solidifies at a predetermined phase transition temperature known for the raw material. The temperature of the targeted area of the melt puddle begins to rapidly drop before generally leveling off during an arrest period prior to solidification. The analysis component may utilize the predetermined phase transition temperature as a reference and the temperature measurements taken during the arrest period to determine one or more calibration parameters for the optical pyrometer. Moreover, embodiments may perform calibration at a plurality of target areas, prior to formation of an additive manufacturing part, after formation of a portion of the additive manufacturing part, or the like. This may allow disclosed systems and methods to adjust for drift during and additive manufacturing process. For instance, embodiments may be configured for calibration during a build process without significant adding to the total build time. Calibration during a build process may allow for correction of temperature measurements, which may reduce potential waste from improperly formed work pieces, reduce smoke generation, or otherwise allow for a more efficient build process.

Calibration of optical pyrometers in an additive manufacturing system may allow for constant heating temperature of raw material based on heat from an electron beam gun. For instance, a calibrated optical pyrometer may allow for heat measurements and calculations to determine the amount of energy deposited in layers of an additive manufactured part. Moreover, estimations of temperature distribution of a build area, and emissivity and heat conductivity of raw material (e.g., powder, sintered powder, solid material) may be calculated based on measurements from a calibrated optical pyrometer. In examples, areas of anomalies may be detected to identify oxidization, contamination, or other causes for anomalies. As such, the devices, systems, and methods described herein can result in quicker and more accurate formation of an article using additive manufacturing, whereby a calibrated thermal sensor may allow for identification of improper materials, contamination, or the like. Identification of the anomaly may allow for correction prior to article formation and/or completion. Further, identification of contamination may reduce waste as a work piece, that would have otherwise been contaminated, may be corrected.

It is noted that embodiments may be applicable to electron-beam additive manufacturing. electron-beam additive manufacturing, which may also be known as electron-beam melting (EBM), is a type of additive manufacturing (e.g., 3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam. However, it may be appreciated that the embodiments described herein may be applicable to other types of article formation. Accordingly, the present disclosure is not limited solely to use with EBM processes.

The systems described herein that utilize EBM generally obtain data from a 3D computer-aided design (CAD) model and use the data to place successive layers of the raw material using an apparatus to spread the raw material, such as a powder distributor. The successive layers are melted together utilizing one or more electron beams. As noted above, the process takes place within a vacuum or vacuum like environment (e.g., within a predetermined pressure level), such as within a vacuum sealed build chamber, which makes the process suited to manufacture parts using reactive materials having a high affinity for oxygen (e.g., titanium). In embodiments, the process operates at elevated temperatures higher temperatures (up to about 1000° C. or higher depending on metal alloy) relative to other additive manufacturing processes, which can lead to differences in phase formation through solidification and solid-state phase transformation. At these higher temperatures, care must be taken to ensure that temperature fluctuations remain within a predetermined range to ensure correct formation of an article. For example, the appropriate temperature fluctuations within a predetermined range may allow for increased instances of correct microstructure, prevention of cracks and homogenous solidification without delamination.

FIG. 1 depicts an additive manufacturing system 100 that primarily includes a build chamber 120, one or more electron beam emitters (e.g., a first electron beam emitter 101 and a second electron beam emitter 102), an imaging device 108, a thermal sensor 116, and an analysis component 140. The build chamber 120 defines an interior 122 that is separated from an exterior environment 123 via one or more chamber walls 121. It is noted that the additive manufacturing system 100 may include additional or other components. For example, the one or more electron beam emitters may include any number of appropriate electron beam emitters and/or different makes and models of electron beam emitters. Moreover, the additive manufacturing system 100 may include other or additional heat sources.

In some embodiments, the interior 122 of the build chamber 120 may be a vacuum sealed interior such that an article or additive manufacturing part formed within the build chamber 120 is formed under controlled conditions, such as a controlled atmosphere, controlled temperature, or the like. The build chamber 120 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the analysis component 140 such that the analysis component 140 directs operation of the vacuum system to maintain the vacuum within the interior 122 of the build chamber 120. As used herein, the term "communicatively coupled" generally refers to any link in a manner that facilitates communications. As such, "communicatively coupled" includes both wireless and wired communications, including those wireless and wired communications now known or later developed. In some embodiments, the vacuum system may maintain a base pressure of about $1\times10^{-5}$ mbar or less throughout an entire build cycle. In further embodiments, the vacuum system may provide a partial pressure of He to about $2\times10^{-3}$ mbar during a melting process. Other gases may be utilized at parrusal pressure, such as argon (Ar) at partial pressure as low as about $1\times10^{-6}$ mbar or less.

In other embodiments, the build chamber 120 may be provided in an enclosable chamber provided with ambient air and atmosphere pressure. In yet other embodiments, the build chamber 120 may be provided in open air.

The build chamber 120 generally includes within the interior 122 a build envelope 115 including a build platform 114 supporting a powder layer 112 thereon, as well as a powder distributor 110. In some embodiments, the build chamber 120 may further include one or more raw material hoppers 106, 107 that maintain raw material therein, which may be in a powder form. The build chamber 120 may further include other components, particularly components that facilitate EBM, including components not specifically described herein.

The build envelope 115 is generally an area within the interior 122 of the build chamber 120 that includes a platform or receptacle that is arranged to receive the raw material from the one or more raw material hoppers 106, 107 and/or support an additive manufacturing part (e.g., a workpiece) thereon. The build envelope 115 is not limited in size or configuration by the present disclosure, but may generally be shaped and sized to hold an amount of the raw material from the raw material hoppers 106, 107 in the form of the powder layer 112, one or more additive manufacturing parts or a portion thereof, and/or melt puddles (e.g., FIGS. 2A-2D), as described in greater detail herein.

Still referring to FIG. 1, in some embodiments, the build envelope 115 may include a movable build platform 114 supported by a lifting component 117. The movable build platform 114 may generally be a surface within the build envelope 115 that is movable by the lifting component 117 in a system vertical direction (e.g., in the +y/−y directions of the coordinate axes of FIG. 1) to increase and/or decrease a total volume of the build envelope 115. For example, the movable build platform 114 within the build envelope 115 may be movable by the lifting component 117 in a downward direction (e.g., toward the −y direction of the coordinate axes of FIG. 1) so as to increase the volume of the build envelope 115 and to add successive powder layer 112 while an additive manufacturing part is being formed. The lifting component 117 is not limited by the present disclosure, and may generally be any device or system capable of being coupled to the movable build platform 114 and movable to raise or lower the movable build platform 114 in the system vertical direction (e.g., in the +y/−y directions of the coordinate axes of FIG. 1). In some embodiments, the lifting component 117 may utilize a linear actuator type mechanism to effect movement of the movable build platform 114. Illustrative examples of devices or systems suitable for use as the lifting component 117 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 117 may be located within the build chamber 120. In other embodiments, the lifting component 117 may be only partially located within the build chamber 120, particularly in embodiments where it may be desirable to isolate portions of the lifting component 117 that are sensitive to the harsh conditions (e.g., high heat, excessive dust, etc.) within the interior 122 of the build chamber 120.

The powder distributor 110 is generally arranged and configured to lay down and/or spread a layer of the raw material from raw material hoppers 106, 107 as the powder layer 112 in the build envelope 115 (e.g., on start plate or the build platform 114 within the build envelope 115). That is, the powder distributor 110 is arranged such that movement of the powder distributor 110 is in a horizontal plane defined by the x-axis and the z-axis of the coordinate axes depicted in FIG. 1. Each of the raw material hoppers 106, 107 may generally be containers that hold an amount of the raw material therein and contain an opening to dispense the raw material therefrom. While FIG. 1 depicts two raw material hoppers 106, 107, the present disclosure is not limited to such. That is, any number of raw material hoppers may be utilized without departing from the scope of the present disclosure. Further, while FIG. 1 depicts the raw material hoppers 106, 107 as being located within the interior 122 of the build chamber 120, the present disclosure is not limited to such. That is, the raw material hoppers 106, 107 may be located outside or partially outside the build chamber 120 in various other embodiments. However, it should be understood that if a raw material hopper is located outside or partially outside the build chamber 120, one or more outlets of the raw material hoppers that supply the raw material may be selectively sealed when not distributing the raw material in order to maintain the vacuum within the build chamber 120.

The shape and size of the raw material hoppers 106, 107 are not limited by the present disclosure. That is, the raw material hoppers 106, 107 may generally have any shape and or size without departing from the scope of the present disclosure. In some embodiments, each of the raw material hoppers 106, 107 may be shaped and or sized to conform to the dimensions of the build chamber 120 such that the raw material hoppers 106, 107 can fit inside the build chamber 120. In some embodiments, the raw material hoppers 106, 107 may be shaped and sized such that a collective volume of the raw material hoppers 106, 107 is sufficient to hold an amount of raw material that is necessary to fabricate additive manufacturing parts, which includes a sufficient amount of material to form the powder layer 112 and additional material that makes up the unfused raw material.

In embodiments, the raw material hoppers 106, 107 may generally have an outlet for ejecting the raw material located within the raw material hoppers 106, 107 such that the raw material can be spread by the powder distributor 110, as described herein. In some embodiments, such as the embodiment depicted in FIG. 1, the raw material may freely flow out of the raw material hoppers 106, 107 under the force of gravity, thereby forming piles or scree of raw material for the powder distributor 110 to spread. In other embodiments, the outlets of the raw material hoppers 106, 107 may be selectively closed via a selective closing mechanism so as to only distribute a portion of the raw material located within the respective raw material hoppers 106, 107 at a particular time. The selective closing mechanisms may be communicatively coupled to the analysis component 140 such that data and/or signals transmitted to/from the analysis component 140 can be used to selectively open and close the outlets of the raw material hoppers 106, 107.

The raw material contained within the raw material hoppers 106, 107 and used to form the article is not limited by the present disclosure, and may generally be any raw material used for EBM now known or later developed. Illustrative examples of raw material includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material include, but are not limited to, $Ti_6Al_4V$ titanium alloy, $Ti_6Al_4V$ ELI titanium alloy, Grade 2 titanium, and ASTM F75 cobalt-chrome (all available from Arcam AB, Mölndal, Sweden). Another specific example of raw material is INCONEL® alloy available from Special Metals Corporation (Huntington WV).

In embodiments, the raw material is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

Figure 3A:
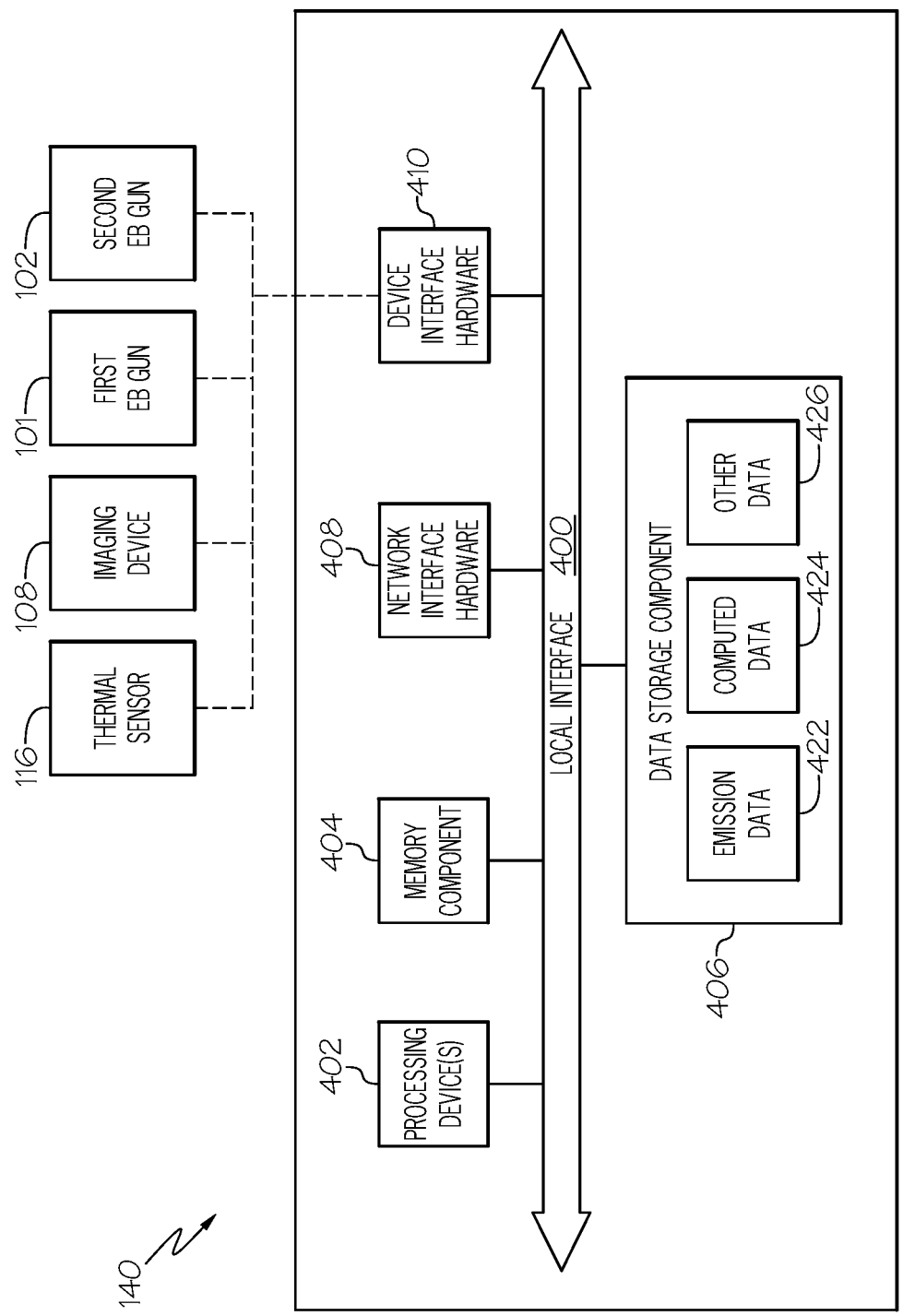
FIG. 3A schematically depicts a block diagram of illustrative components contained within a control unit according to one or more embodiments shown and described herein.

The raw material selected for an additive manufacturing part may include a predetermined melting temperature, a predetermined phase transition temperature, or other predetermined properties. The predetermined melting temperature and the predetermined phase transition temperature may be known and specific to selected raw material. In examples, the analysis component 140 may include a database (e.g., via a data storage component such as shown in FIG. 3A) or communicate with a remote database (e.g., via database server 504) which stores predetermined melting temperatures and the predetermined phase transition temperatures for raw materials. It is noted, however, that predetermined melting temperature and the predetermined phase transition temperature may be received from other sources, such as through user input.

Still referring to FIG. 1, the first electron beam emitter 101 and the second electron beam emitter 102 are each generally a device that emits an electron beam (e.g., a charged particle beam), such as, for example, an electron gun, a linear accelerator, or the like. The first electron beam emitter 101 and the second electron beam emitter 102 each, respectively, generate a beam 151, 152 that may be used for melting or fusing together the raw material when spread as the powder layer 112 on the build platform 114. The present disclosure is not limited to a specific first electron beam emitter 101 and the second electron beam emitter 102.

In general, the first electron beam emitter 101 and the second electron beam emitter 102 each include an electron emitter, at least one focusing coil, at least one deflection coil, at least one astigmatism coil (e.g., a stigmator), and the like. In examples, an electron emitter is generally an electron beam emitting component containing a filament/cathode and/or an anode. In some embodiments, to ensure a directed emission of electrons therefrom, an electron emitter may be formed into a particular shape that is adapted for such an electron emission (e.g., as a loop, a tip having a particular radius of curvature, one or more legs spaced apart from one another, and/or the like). The electron emitter may be constructed of a particular material for emitting electrons, such as, for example, tungsten (W), lanthanum hexaboride ($LaB_6$), or the like. In some embodiments, the electron emitter may be formed as the result of an etching process. An illustrative electron emitter may be provided by Energy Beam Sciences, Inc. (East Granby, CT). In one illustrative embodiment, the electron emitter may produce a focusable electron beam with an accelerating voltage of about 60 kilovolts (kV) and with a beam power in the range of about 0 kilowatts (kW) to about 10 kW. It should be understood that the various features of the electron emitter are merely illustrative, and that other features are also contemplated.

It should be understood that the first electron beam emitter 101 and the second electron beam emitter 102 may include other components that are not specifically recited herein. In a nonlimiting example, the first electron beam emitter 101 and the second electron beam emitter 102 may further include one or more focusing lens, one or more astigmatic lenses, one or more deflection lenses, one or more pumps (e.g., turbo pumps), one or more gate valves, one or more apertures, and/or the like. Moreover, the first electron beam emitter 101 and the second electron beam emitter 102 may include or be coupled to one or more power supplies that are each generally any component that provides electrical power to the components of the first electron beam emitter 101 and the second electron beam emitter 102. A power supply may have a plurality of power outputs and can modulate electricity provided power through the plurality of power outputs. For example, the power supply may be a Tesla transformer, as it produces multi-megavolt pulses of very high power (e.g., on the order of tens of megawatts). In some embodiments, the first electron beam emitter 101 and the second electron beam emitter 102 may include a plurality of columns (e.g., an upper column arranged above a lower column). Such columns may include a pressure differential therebetween (e.g., a pressure differential of about $10^{-4}$ mbar).

Referring again to FIG. 1, the first electron beam emitter 101 and the second electron beam emitter 102 may be communicatively coupled to the analysis component 140, as indicated in FIG. 1 by the dashed line between the first electron beam emitter 101 and the analysis component 140 and the dashed line between the second electron beam emitter 102 and the analysis component 140. The communicative coupling of the first electron beam emitter 101 and the second electron beam emitter 102 to the analysis component 140 may provide an ability for signals and/or data to be transmitted between the first electron beam emitter 101 and the second electron beam emitter 102 and the analysis component 140, such as control signals from the analysis component 140 that direct operation of the first electron beam emitter 101 and the second electron beam emitter 102. That is, the analysis component 140 may transmit one or more signals to each of the first electron beam emitter 101 and the second electron beam emitter 102, the one or more signals directing operation of the first electron beam emitter 101 and the second electron beam emitter 102 independently of one another such that the first electron beam emitter 101 and the second electron beam emitter 102 can separately emit their respective beams 151, 152. As described in more detail herein, the first electron beam emitter 101 and/or the second electron beam emitter 102 may be instructed by the analysis component 140 to heat one or more target areas to form a melt puddle of raw material for a calibration process of the thermal sensor 116, the imaging device 108, or both.

In some embodiments, at least a portion of the one or more chamber walls 121 of the build chamber 120 may include a window therein. The imaging device 108 is generally located adjacent to the build chamber 120 but may be located within the interior 122 of the build chamber 120 before, during, or after a build process. Generally, the imaging device 108 is arranged such that a field of view of the imaging device 108 extends into or onto a build platform 114. It is noted that the imaging device 108 may include one or more image capturing units that may be communicatively coupled together. The imaging device 108 may include one or more line scan cameras, area scan cameras, or other cameras. In embodiments, the imaging device 108 may include silicon (Si) sensor based cameras, a gallium arsenide sensor (GaAs) sensor based cameras, or other cameras. Moreover, the imaging device 108 can include multispectral cameras configured to be sensitive within a predefined spectral sensitivity of the sensor pixels, which may differ from red-green-blue (RGB), near-infrared (NIR), or infrared (IR) sensitivity.

In some embodiments, due to the harsh environment within the build chamber 120, the imaging device 108 and/or thermal sensor 116 may be located adjacent to the build chamber 120 in the exterior environment 123 (i.e., not located within the interior 122 of the build chamber 120). The thermal sensor 116 may be arranged to detect or measure temperature of a surface, such as raw material. For instance, the thermal sensor 116 may comprise an optical pyrometer (e.g., a single point optical pyrometer) that measures thermal radiation emitted from raw material disposed on a surface within the build chamber 120. The thermal sensor 116 is generally located in an area within or adjacent to the build chamber 120 and positioned to obtain information regarding emissions 155, 156 that result from impingement of the beams 151, 152 on one or more target areas.

It should be understood that the location of the imaging device 108 and/or thermal sensor 116 outside the build chamber 120 is not limited by this disclosure. That is, in other embodiments, the imaging device 108 and/or the thermal sensor 116 may be located in the interior 122 of the build chamber 120. Further, the imaging device 108 and/or the thermal sensor 116 may be fixed in a particular location or may be movable (e.g., movable to capture images at different angles, movable to measure temperatures of different areas, or the like within the build chamber 120). In some embodiments, the imaging device 108 and/or the thermal sensor 116 may be removable from the build chamber 120. It is noted that the imaging device 108 and the thermal sensor 116 depicted in FIG. 1 may respectively comprise a single or plurality of imaging devices 108 and single or plurality of thermal sensors 116.

In some embodiments, the thermal sensor 116 may be a contactless temperature sensor configured to measure the measure or otherwise distinguish relative amounts of emitted radiation or heat, such as an optical pyrometer and more particularly, a single point optical pyrometer, positioned to capture thermal radiation emitted from raw material of the powder layer 112 or other material disposed on a surface of the build platform 114 within the build chamber 120. The thermal sensor 116 may be configured to measure intensity of emissions 155, 156 to a known intensity of a reference point, such as an internal calibrated lamp. Thus, the thermal sensor 116 may be a device particularly tuned or otherwise configured to obtain measurements in a spectral range where heat radiation is readily detected, such as the visible spectrum and the infrared spectrum (including the far infrared and the near infrared spectrum) and may be sensitive within a range of wavelengths of about 0.5 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints).

According to some embodiments, the thermal sensor 116 is configured to target one or more areas of raw material within a field of view or sensed area of the thermal sensor 116. In examples, the area of raw material may be for example, from about 0.5 millimeters (e.g., about 0.02 inches) to about 6 millimeters (e.g., about 0.263 inches) in diameter. It is noted, however, that the thermal sensor 116 may include one or more lenses configured to allow for smaller or larger field of views or sensed areas as may be appropriate. In some embodiments, the thermal sensor 116 may include a signal processing unit or the like. For example, the thermal sensor 116 may include transformed sensed intensity of emissions 155, 156 into electrical signals. A signal processing unit may then be used to filter and amplify the electrical signals before transmission of the signals to an analyzing device, such as, for example, the analysis component 140.

As described herein, the thermal sensor 116 may be located in the exterior environment 123 outside the build chamber 120, yet positioned such that the field of view or sensed area of the thermal sensor 116 captures one or more target areas within the build chamber 120, such as a target area on the build platform 114 and/or the powder layer 112. It should be understood that in such embodiments, the one or more chamber walls 121 of the build chamber 120 may include a window or the like such that the imaging device 108 can be positioned adjacent to the window to capture the one or more images. In the embodiments where the thermal sensor 116 is positioned outside the build chamber 120, the harsh environment within the interior 122 of the build chamber 120 does not affect operation of the thermal sensor 116. That is, the heat, dust, metallization, and/or the like that occurs within the interior 104 of the build chamber 120 will not affect operation of the thermal sensor 116. In some embodiments, the thermal sensor 116 is fixed in position such that a field of view or sensed area thereof remains constant (e.g., does not change). Additionally or alternatively, the thermal sensor 116 may be movable to one or more fixed positions such that a field of view or sensed area of the thermal sensor 116 may be adjusted or otherwise positioned to a target area, such as a melt puddle as described herein. For instance, the thermal sensor 116 may be movable relative to the X, Y, and Z coordinates of FIG. 1 to target a particular area within the build chamber 120, such as an area of the powder layer 112, an area of an additive manufacturing part, or the like.

Referring still to FIG. 1, in an embodiment, the thermal sensor 116 is a single point pyrometer and the imaging device 108 is a multipoint pyrometer (e.g., single or multiple wavelength band) that includes a field of view that is larger than the field of view of a single point pyrometer. In some embodiments, a multipoint pyrometer may include a field of view that substantially encompasses the area of the build platform 114 and/or build chamber 120. The thermal sensor 116 may further be a device particularly configured to provide signals and/or data corresponding to the measured intensity, the mathematical expression, and/or the beam spot size to the analysis component 140. Further, optical pyrometers may include a silicon sensor based optical pyrometer, a gallium arsenide sensor based optical pyrometer, a bolometer, or other optical pyrometer. In an example embodiment, the imaging device 108 is an area scan camera communicatively coupled to the analysis component 140 and the thermal sensor 116 is a single point pyrometer. The area scan camera may be configured to measure temperature difference in a field of view of the imaging device 108 while the single point optical pyrometer is configured to measure absolute temperature at a target area. The analysis component 140 can be configured to identify at least one of a potential area of contamination or inappropriate powder based on the measurements from the area scan camera and/or the single point optical pyrometer.

The thermal sensor 116 may be communicatively coupled to the analysis component 140, as indicated in FIG. 1 by the dashed line between the thermal sensor 116 and the analysis component 140. The analysis component 140 can receive thermal data from the thermal sensor 116. The analysis component 140 determines temperature variations over a time period based on the thermal data from the thermal sensor 116.

Still referring to FIGS. 1 and 2A-2D, the analysis component 140 receives image data from the thermal sensor 116 corresponding to the thermal radiation of the melt puddle 113 during solidification. The thermal sensor 116 may be an area scan camera that is capable of providing data specific to one or more regions of interest within the field of view, including regions of interest that move within the field of view. It is noted that one or more area scan cameras may be utilized with other thermal sensors. In general, an area scan camera includes pixels configured to sense radiation in one or more wavelength band. The pixels may be dynamically adjusted or statically formed such as by external filters (attenuation- or interference type filters). The external filters may be narrow band filters to further diminish the influence of spectrally varying emissivity. That is, an area scan camera includes a matrix of pixels that allows the device to capture a 2D image in a single exposure cycle with both vertical and horizontal elements. Area scan cameras can further be used to obtain a plurality of successive images, which is useful when selecting regions of interest within the field of view and observing a change in the regions of interest. Illustrative examples of such area scan cameras include those available from Basler AG (Ahrensburg, Germany), JAI Ltd. (Yokohama, Japan), National Instruments (Austin, TX), and Stemmer Imaging (Puchheim, Germany).

The thermal sensor 116 may capture multispectral data for the purposes of monitoring the temperature of the powder layer 112 at one or more wavelength bands. The analysis component 140 may calculate the derivative of subsequent pixel values of received from the thermal sensor 116 related to the thermal data provided by the thermal sensor 116. As described herein, when temperature of melt puddle 113 reaches the predetermined phase transition temperature, the derivative of heat radiation (e.g., pixel values) is virtually constant (e.g., from FIGS. 2B-2D). The pixel value derivative turns sharply again as the melt puddle 113 solidifies (e.g., FIG. 2D). The radiation during the arrest period can be an arrest period metric that may be a calculation of a measurements taken during the arrest period, such as an average of a number of midpoint values during the arrest period. The arrest period is generally a period defined by a start time associated with a first temperature drop rate exceeding a first threshold and an end time associated with a second temperature drop rate exceeding a second threshold.

In embodiments, the analysis component 140 may identify thermal data received during the arrest period and may utilize the thermal data to calibrate the thermal sensor 116. For instance, the analysis component 140 may average measurements from the analysis component 140 to determine average measurements from the thermal sensor 116 during the arrest period. As described herein, the predetermined phase transition temperature and/or the predetermined melting temperature are generally known and are specific for the raw material. For instance, tungsten has a predetermined melting temperature of about 3410° C. and a predetermined phase transition temperature of about 3410° C. Embodiments may utilize other raw materials having predetermined melting and phase transition temperatures, such as titanium (Ti), titanium aluminide (TiAl), cobalt-chromium (CoCr), nickel-base super alloys, or other raw materials. Other raw materials include predetermined melting temperatures and predetermined phase transition temperatures specific to each material. As such, the predetermined phase transition temperature and/or the predetermined melting temperature may be selected based on the composition of the raw material and may serve as reference points for calibration. Calibration may allow the analysis component 140 to accurately control the first electron beam emitter 101 and the second electron beam emitter 102 to apply an appropriate amount of head to the powder layer 112. This may allow for increased energy efficiency, reduced smoke production, identification of areas of powder layer 112 which do not conform to the predetermined melting point, or the like, as described herein.

Based on the thermal data and the predetermined phase transition temperature and/or the predetermined melting temperature, the analysis component 140 may determine one or more calibration parameters for the thermal sensor 116. The calibration parameter may include adjusting an internal reference temperature of the thermal sensor 116 positively or negatively, such that measurements from the thermal sensor 116 are calibrated according to the thermal data during the arrest period and the reference point of the predetermined phase transition temperature and/or the predetermined melting temperature. In embodiments, the analysis component 140 may transmit one or more instructions to the thermal sensor 116 in accordance with the one or more calibration parameters.

In embodiments, the additive manufacturing system 100 may include a calibration system 190 that includes the thermal sensor 116 and the analysis component 140. The analysis component 140 may be programmed to instruct at least one of the first electron beam emitter 101 or the second electron beam emitter 102 to heat a first target area of raw material of the powder layer 112 to at least a predetermining melting temperature (e.g., the predetermining melting temperature, a determined amount above the predetermined melting temperature, etc.) associated with the raw material. In embodiments, the raw material can be a sintered powered that may be sintered prior to melting to reduce smoke generation during melting.

Referring now to FIGS. 1 and 2A-2D, FIGS. 2A-2D depict an illustrative melt puddle during various cooling phases advancing in time from 2A to 2D. In embodiments, at least one of the first electron beam emitter 101 or the second electron beam emitter 102 may melt the target area of raw material to form a melt puddle 113. The melt puddle 113 may be about 0.5-6.0 millimeters in diameter (e.g., about 0.02-0.263 inches in diameter). The melt puddle 113 may be formed in other sizes but is generally formed relatively small in size to reduce time requirements, such as about 0.5-6.0 millimeters in diameter (e.g., about 0.02-0.263 inches in diameter). The first electron beam emitter 101 or the second electron beam emitter 102 may melt the target area of raw material to form a pool having various shapes, such as, for example, a generally circular shape with an inwardly or outwardly extending wedge that may increase a boundary surface area between the melt puddle 113 and adjacent areas of the powder layer 112 that are not melted. For instance, the shape may include an inwardly extending wedge of powdered material such that the melt puddle 113 may represent a pie-like shape with a slice or wedge of powdered material inwardly extending. This may increase the boundary surface area while generally not increasing the area of the melt puddle 113. An increased boundary surface area may allow for a decreased temperature gradient and/or alter an arrest period based on the shape.

Figure 2A:
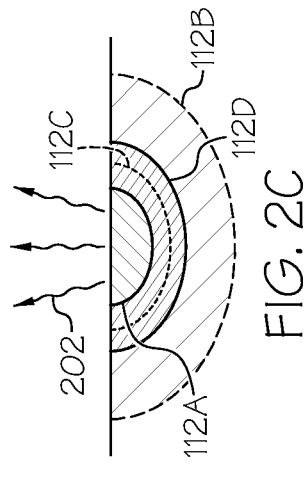
FIG. 2A depicts an illustrative melt puddle during a first cooling phases after terminating application of heat according to one or more embodiments shown and described herein.
Figure 2C:
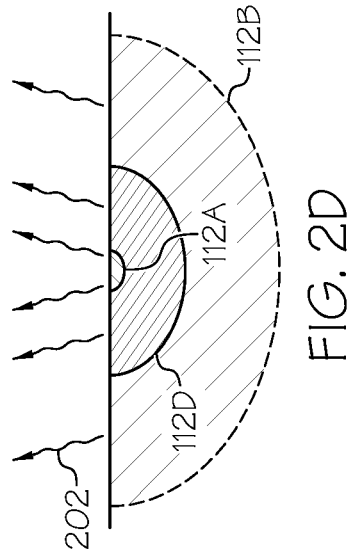
FIG. 2C depicts the illustrative melt puddle of FIG. 2B during a third cooling phases after the second cooling phase according to one or more embodiments shown and described herein.
Figure 2B:
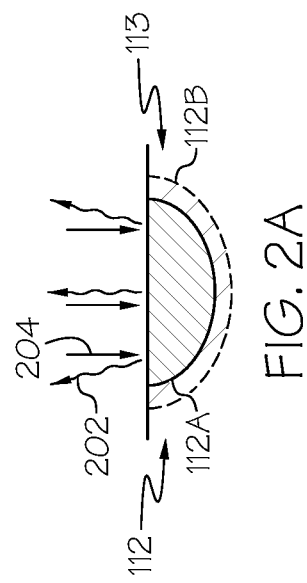
FIG. 2B depicts the illustrative melt puddle of FIG. 2A during a second cooling phases after the first cooling phase according to one or more embodiments shown and described herein.
Figure 2D:
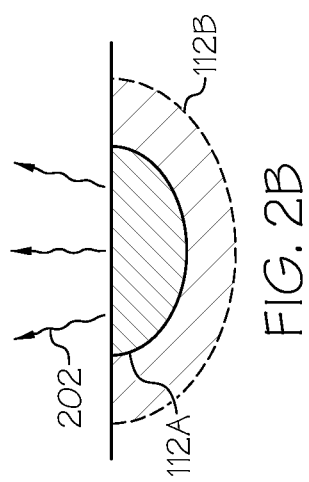
FIG. 2D depicts the illustrative melt puddle of FIG. 2C during a fourth cooling phases after the third cooling phase according to one or more embodiments shown and described herein.

The thermal sensor 116 (e.g., a high spatial resolution area scan camera) may resolve different mater states such as a liquid emissivity (e.g., emissivity of a liquid phase 112A in FIGS. 2A-2D), powder emissivity (e.g., emissivity of powder area 112B in FIGS. 2A-2D), and solid emissivity (e.g., emissivity of area of solid phase 112C in FIGS. 2C-2D). The temperature may be generally the same for all areas of the melt puddle 113 while the heat radiation may be different and may be captured by the thermal sensor 116 for calculation of emissivity. The analysis component 140 is programmed to determine emissivity variation parameters between states of the raw material based on the thermal data from the thermal sensor 116, and may determine the one or more calibration parameters from the emissivity variation parameters, the thermal data, and the predetermined phase transition temperature.

Still referring to FIGS. 1 and 2A-2D, and particularly to FIG. 2A, the melt puddle 113 may be formed as beams 151 and/or 152 applying heating directed to the target area of the powder layer 112. Once the melt puddle 113 forms, the raw material is in a liquid phase 112A that extends to a powder 112B, which may be a preheated raw material area. In embodiments, the analysis component 140 may be programmed to instruct at least one of the first electron beam emitter 101 or the second electron beam emitter 102 to heat a target area of raw material of the powder layer 112 to a predetermining melting temperature associated with the raw material and/or a threshold temperature above the predetermined melting temperature for a predetermined amount of time. Thermal emissions 155 and/or 156 may be emitted by the liquid phase 112A and the powder 112B. The thermal sensor 116 may capture the emitted thermal radiation 202. When the melt puddle 113 is formed as a liquid, the heating may be terminated as shown in FIG. 2B.

Turning now to FIG. 2B, with reference to FIG. 1, the application of heat is terminated (e.g., as shown by removal of beams 151 and 152 in FIG. 2B), the thermal conductivity of the liquid phase 112A stops overheating above the predetermined melting temperature. The thermal sensor 116 may capture the emitted thermal radiation 202. In general, the temperature of the liquid drops significantly and rapidly from the threshold temperature above the predetermined melting temperature to generally the melting temperature.

Referring now to FIG. 2C, with reference to FIG. 1, the melt puddle 113 may begin to transform phases with the liquid phase 112A being radially surrounded by an area of thickened or mush phase 112D. The mush phase 112D (e.g., an area having greater viscosity than the liquid phase 112A) may be radially surrounded by an area of solid phase 112C. The solid phase 112C may be radially surrounded by the powder 112B. The analysis component 140 may be programmed to receive thermal data associated with the target area from the optical pyrometer during the period shown in FIG. 2C as the liquid phase 112A is transitions from a liquid to a solid. The analysis component 140 may determine an arrest period temperature metric based on the thermal data and the predetermined phase transition temperature as described herein.

Referring to FIG. 2D, with reference to FIG. 1, the melt puddle 113 further changes phases such that the liquid phase 112A continues decreasing in area and begins solidifying. The liquid phase 112A is radially surrounded by the area of solid phase 112C, which continues to increase in area relative to FIG. 2C. Once the liquid phase 112A becomes a solid, the temperature of the melt puddle 113 again significantly and rapidly drops. The thermal sensor 116 may capture thermal data of the melt puddle 113 after or while the melt puddle 113 solidifies, which may include thermal data of measurements of thermal emissions captured from the melt puddle 113 after the arrest period.

Still referring to FIGS. 1 and 2A-2D, the analysis component 140 receives thermal data, such as thermal emissions measured from the melt puddle 113 correlated with temporal points of when thermal emissions were captured, from the thermal sensor 116 corresponding to the thermal radiation of the melt puddle 113 (e.g., the target area of raw material) after the melt puddle 113 has been heated to at or above the predetermined melting temperature associated with the raw material (as shown in FIG. 2B). The analysis component 140 may store the thermal data from the thermal sensor 116 in a memory component (e.g., as emission data 422 within data storage component 406 of FIG. 4). The analysis component 140 may continue to receive thermal data from the thermal sensor 116 at least until the melt puddle 113 (e.g., a first target area of raw material) solidifies at a predetermined phase transition temperature associated with the raw material (as shown in FIG. 2D). The time between the melt puddle 113 reaching a predetermined melting temperature and the predetermined phase transition temperature can be referred to as an arrest time, and may be generally shown in FIG. 2C. The temperature during the arrest time may be generally constant. Moreover, the analysis component 140 may identify the arrest time by analyzing the thermal data to identify a first high change rate in temperature which may occur as heat is removed (as shown in FIG. 2B) and a second high change rate in temperature which may occur as the predetermined phase transition temperature is reached (as shown in FIG. 2D).

In at least some embodiments, the analysis component 140 may determine arrest period temperature metrics, such as a cooling rate, based on the thermal data received from the thermal sensor 116. The analysis component 140 may analyze the cooling rate during the time when the predetermined phase transition temperature is reached. The cooling rate is generally diminished due to heat of solidification. This predetermined phase transition temperature is a known material property based on the raw material and may be utilized as a temperature reference to which the thermal sensor 116 is calibrated.

The time it takes to solidify (i.e., solidification time) may be between about 0.1-5 seconds after the first electron beam emitter 101 and/or the second electron beam emitter 102 terminate heating. The solidification time is generally long enough for thermographic measurements using the thermal sensor 116 (e.g., an optical pyrometer, area scan camera, etc.). This may allow for calibration of the thermal sensor 116 utilizing the predetermined melting temperature and/or the predetermined phase transition temperature of the raw material as reference points. According to embodiments, the thermal sensor 116 may measure thermal emissions during an arrest period. The predetermined phase transition temperature may be known for the raw material utilized such that it serves as a reference to which the measured temperature of the thermal sensor 116 during the arrest period is calibrated.

In some embodiments, the analysis component 140 may be programmed to instruct at least one of the first electron beam emitter 101 or the second electron beam emitter 102 to apply heat for a predetermined amount of time prior to melting (e.g., preheat, presinter, etc.). In examples, the analysis component 140 may be programmed to instruct at least one of the first electron beam emitter 101 or the second electron beam emitter 102 to heat an area larger than the first target area (e.g., the area to be heated for formation of the melt puddle 113), such as an area around or in proximity to where the melt puddle 113 is to be formed. Preheating the area near the target area (e.g., an area extending radially about the melt puddle 113) may increase a solidification time of the melt puddle 113.

In at least some embodiments, the analysis component 140 may be programmed to instruct at least one of the first electron beam emitter 101 or the second electron beam emitter 102 to apply heat an area of the powder layer 112 around the first target area until it reaches a predetermined threshold temperature for preheating, which may be generally less than a predetermined melting temperature for the raw material. For instance, the analysis component 140 may be programmed to instruct at least one of the first electron beam emitter 101 or the second electron beam emitter 102 to apply heat until the temperature of the area near the first target area is raised to the predetermined threshold temperature for preheating, which may be about 0.75 percent of the temperature difference between base or ambient temperature and the predetermined melting temperature. It is noted that the predetermined threshold temperature for preheating may be generally near the predetermined melting temperature for the raw material without reaching or exceeding the predetermined melting temperature. In embodiments, the preheating may be applied during a time period that is long enough such that the heat will penetrate the underlying material. Preheating may be particularly well suited for material with high thermal conductivity. Moreover, preheating can be performed before or during electron beam scan pattern application. As described herein, heating the area of the powder layer 112 may increase the solidification time of the melt puddle 113 while generally not increasing a total build time for an additive manufactured part.

In some embodiments, the imaging device 108 may include a multi-point optical pyrometer or a plurality of single point optical pyrometers that may capture thermal data of one or more different target areas than the first target area of raw material (e.g., a second target area, a third target area, a forth target area, etc.) that is generally larger than the first target area. The analysis component 140 may calibrate the imaging device 108 by adjusting the imaging device 108 based on the thermal data obtained during the arrest period a (e.g., an arrest period temperature metric), thermal data at or after solidification, and thermal data capturing by the imaging device 108.

In embodiments, the additive manufacturing system 100 may, via the calibration system 190 iterate calibration of the thermal sensor 116 at different areas of the powder layer 112 (e.g., a second area, a third area, a fourth area, etc.). In examples, distribution of reference melt puddles over the build area will allow temperature calibration. Moreover, iteration of calibration may occur at different times, such as after building some or all of an additive manufacturing part to account for or otherwise remove drift. The calibration may utilize active feedback and off-line recalculation of heat distribution for calibration.

Still referring to FIGS. 1 and 2A-2D, the analysis component 140 may instruct the first electron beam emitter 101 and/or the second electron beam emitter 102 to heat one or more additional target areas of the powder layer 112 to at least the predetermined melting temperature or a threshold temperature above the predetermined melting temperature. In response to the one or more additional target areas of the powder layer 112 forming one or more melt puddles, the analysis component 140 may instruct the first electron beam emitter 101 and/or the second electron beam emitter 102 to terminate the heating. It is noted that the analysis component 140 may be programmed to instruct heating of areas surrounding the one or more additional target areas to a threshold temperature below a predetermined melting temperature (e.g., preheat, presinter, etc.).

In embodiments, the one or more melt puddles may transform or alter states as shown in FIGS. 2A-2D. The analysis component 140 may receive thermal data associated with each of the one or more melt puddles captured by the thermal sensor 116 as the one or more melt puddles transition from a liquid to a solid. The analysis component 140 may determine, in response to the one or more melt puddles solidifying, cooling rates and/or arrest periods metrics for the one or more melt puddles. The analysis component 140 may determine one or more calibration parameters based on the cooling, arrest period temperature metrics, measured thermal data, and/or predetermined phase transition temperature. Moreover, the analysis component 140 may instruct the thermal sensor 116 to adjust an internal setting based on the determined one or more calibration parameters.

In embodiments, the analysis component 140 is programmed to identify foreign material within the raw material based on the thermal data from the thermal sensor 116 indicating that at least one of a melting temperature or a phase transition temperature of an area of raw material deviates a threshold amount from at least one of the predetermined melting temperature or the predetermined phase transition temperature. For instance, the thermal sensor 116 may record emission data of the melt puddle 113 or other areas of raw material within the build chamber 120. If the emission data indicates that there is an abnormality that places a temperature gradient outside of known-good operating parameters, the analysis component 140 may identify a potential contamination area. The abnormality may be due to a contaminated raw material, a wrong raw material, or the like. The contamination area may be identified by a pixel coordinate. The analysis component 140 may generate an alert identifying the potential contamination area.

Referring to FIG. 1, the analysis component 140 may generate instructions for the first electron beam emitter 101 and/or the second electron beam emitter 102 to build an additive manufacturing part. The analysis component 140 transmits one or more instructions to the first electron beam emitter 101 and/or the second electron beam emitter 102 in accordance with the one or more calibration parameters. For instance, the analysis component 140 may generate instructions regarding power settings, intensity, or the like. In some examples, the analysis component 140 may generate instructions to preheat areas of powder layer 112 to temperatures below the predetermined melting temperature utilizing thermal data from the calibrated thermal sensor 116.

Still referring to FIGS. 1 and 2A-2D the analysis component 140 may recalibrate the thermal sensor 116 after the additive manufacturing system 100 builds at least a portion of an additive manufacturing part. In examples, the thermal sensor 116 may be subject to drift and may benefit from calibration throughout a build process. Calibration can be iterated an appropriate amount of times. In an example, the analysis component 140 may instruct the first electron beam emitter 101 and/or the second electron beam emitter 102 to heat one or more additional target areas of the raw material disposed on an additive manufacturing part and/or build platform 114 to the predetermined melting temperature or a threshold temperature above the predetermined melting temperature to form a melt puddle. In response to forming one or more melt puddles after building at least a portion of an additive manufacturing part, the analysis component 140 may instruct the first electron beam emitter 101 and/or the second electron beam emitter 102 to terminate the heating. The thermal sensor 116 may capture thermal data of the one or more melt puddles as they transition from a liquid to a solid. In response to solidification, the analysis component 140 may determine one or more calibration parameters based on the arrest period temperature metrics (e.g., cooling rate during arrest period), measured thermal data, and/or predetermined phase transition temperature. Moreover, the analysis component 140 may instruct the thermal sensor 116 to adjust an internal setting based on the determined one or more calibration parameters.

Referring again to FIG. 1, the additive manufacturing system 100 may include at least one optical filter coupled to the thermal sensor 116. The optical filter can be a narrow band optical filter and can be configured to set measurement wavelengths. The narrow band optical filter may remove effects from varying spectral emissivity and optical transmission. This may reduce error due to wavelength dependent emissivity variations when extrapolating temperatures. In embodiments, a single filter may be utilized. In other embodiments, a plurality of filters may be utilized.

In embodiments, the thermal sensor 116 may comprise a multi-wavelength (e.g., two or more -wavelength pyrometer). A two-wavelength pyrometer may be calibrated based on emissivity ratio utilizing the predetermined melting temperature and predetermined phase transition temperature for a known raw material. As described herein, the analysis component 140 may identify abnormalities by detecting deviation in melting temperature using a calibrated two-wavelength pyrometer. In an example, a two wavelengths may eliminate spectrally neutral variations in emissivity and transmission, while three wavelengths may improve errors from spectral variations.

In some embodiments, the imaging device 108 may be a camera (e.g., a calibration camera) or the like. As such, the imaging device 108 may obtain one or more images of the interior 104 of the build chamber 120. In some embodiments, the imaging device 108 may generally be configured for sensing a heat response generated as a result of impingement of the electron beams 151, 152 on a surface and/or for sensing electromagnetic radiation generated as a result of impingement of the electron beams 151, 152 on a surface. For example, the imaging device 108 may be particularly configured (e.g., via components such as filters, image sensors, and/or the like) to obtain information in the infrared (IR) spectrum, the near infrared (NIR) spectrum, and/or the visible spectrum. In some embodiments, the imaging device 108 may be a pre-calibrated imaging device that is particularly calibrated for use as described herein.

In some embodiments, the imaging device 108 may further be a device particularly configured to provide signals and/or data corresponding to the captured images, the mathematical expression, and/or the beam spot size to the analysis component 140. As such, the imaging device 108 may be communicatively coupled to the analysis component 140, as indicated by the dashed lines depicted in FIG. 1 between the imaging device 108 and the analysis component 140.

Still referring to FIG. 1, the imaging device 108, when arranged and configured such that, when the electron beams 151, 152 impinge a particular portion of the build platform 114, a calibration component disposed on the build platform 114, and/or the article, an area of contact (as well as characteristics of the area of contact) are captured by the imaging device 108, which can be used in conjunction with a reference point (or reference points) to determine one or more coordinates (e.g., x and y coordinates) of the area of contact. As the beams 151, 152 move to impinge on various parts of the build platform 114, a calibration component disposed on the build platform 114, and/or the article 142 (e.g., moves between various surface features), the movement of the area of contact may be captured as one or more subsequent images by the imaging device 108, which can also be used to determine one or more coordinates (e.g., x and y coordinates of the area of contact). Additional details regarding operation of the imaging device 108 for the purposes of calibration will be discussed in greater detail below.

In some embodiments, the imaging device 108 is a device particularly configured to sense electromagnetic radiation, particularly heat radiation (e.g., thermal radiation) that is generated by the various components within the build chamber 120 (e.g., the powder layer 112, the raw material 141, and/or the article 142). Thus, the imaging device 108 may generally be a device particularly tuned or otherwise configured to obtain images in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared camera. In some embodiments, the imaging device 108 may be a camera that is sensitive within a range of wavelengths of about 1 micrometer (μm) to about 14 μm, including about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or any value or range between any two of these values (including endpoints). As such, the imaging device 108 is suitable for imaging temperatures which occur during EBM of the powder layer 112. In some embodiments, the wavelength sensitivity of the imaging device 108 may be selected in accordance with the type of raw material used. In certain embodiments, the imaging device 108 may be a multispectral camera. Illustrative examples of suitable devices that may be used for the imaging device 108 include, but are not limited to, an IR-camera (Infrared-camera), NIR-camera (Near Infrared-camera), a VISNIR-camera (Visual Near Infrared-camera), a CCD camera (Charged Coupled Device-camera), and a CMOS-camera (Complementary Metal Oxide Semiconductor-camera).

The analysis component 140 is generally a device that is communicatively coupled to one or more components of the additive manufacturing system 100 (e.g., the powder distributor 110, the imaging device 108, and/or each of the first electron beam emitter 101 and the second electron beam emitter 102) and is particularly arranged and configured to transmit and/or receive signals and/or data to/from the one or more components of the additive manufacturing system 100. Additional details regarding the analysis component 140 are discussed herein with respect to FIGS. 3A-3B.

Turning to FIG. 3A, the various internal components of the analysis component 140 depicted in FIG. 1 is shown. Particularly, FIG. 3A depicts various system components for analyzing data received from the imaging device 108 and/or assisting with the control of various components of the additive manufacturing system 100 depicted in FIG. 1.

As illustrated in FIG. 3A, the analysis component 140 may include one or more processing devices 402, a non-transitory memory component 404, network interface hardware 408, device interface hardware 410, and a data storage component 406. A local interface 400, such as a bus or the like, may interconnect the various components. It is noted that the analysis component 140 may include other or different components.

The one or more processing devices 402, such as a computer processing unit (CPU), may be the central processing unit of the analysis component 140, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 406 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to complete various processes, such as the processes described herein with respect to FIGS. 5-7.

Figure 3B:
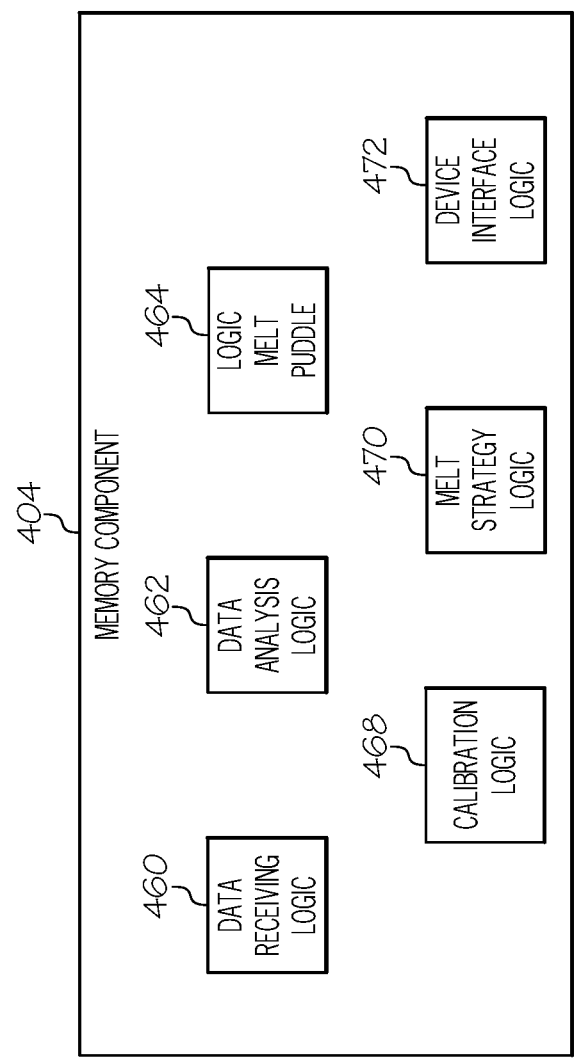
FIG. 3B depicts a block diagram of illustrative modules contained within a memory component of a control unit according to one or more embodiments shown and described herein.

Still referring to FIG. 3A, the programming instructions stored on the memory component 404 may be embodied as a plurality of software logic modules, where each logic module provides programming instructions for completing one or more tasks. FIG. 3B depicts the various modules of the memory component 404 of FIG. 3A according to various embodiments.

As shown in FIG. 3B, the memory component 404 includes a plurality of logic modules. Each of the logic modules shown in FIG. 3B may be embodied as a computer program, firmware, or hardware, as an example. Illustrative examples of logic modules present in the memory component 404 include, but are not limited to, data receiving logic 460, data analysis logic 462, melt puddle logic 464, spot size determination logic 466, calibration logic 468, melt planning logic 470, and/or device interface logic 472.

Referring to FIGS. 3A and 3B, the data receiving logic 460 includes one or more programming instructions for receiving data from the imaging device 108 and/or the thermal sensor 116. That is, the data receiving logic 460 may cause a connection between the device interface hardware 410 and the imaging device 108, the thermal sensor 116, or other devices such that data transmitted by the imaging device 108, the thermal sensor 116, or other device is received by the analysis component 140 and may be stored within the data storage component 406 (e.g., as emission data 422, other data 426, etc.).

Referring to FIGS. 1 and 3B, the data analysis logic 462 includes one or more programming instructions for analyzing the data received from the imaging device 108 and/or thermal sensor 116. That is, the data analysis logic 462 contains programming for analyzing the data received from the imaging device 108 and/or thermal sensor 116 that corresponds to the detected emissions that result from impingement of the beams 151, 152 on raw materials and/or emissions from the raw material, such as a emissions 156 from the melt puddle 113 (FIGS. 2A-2D), as described herein. The data analysis logic 462 may further include programming instructions for analyzing data continuously as a melt puddle is headed, cooled, and solidified as described herein.

Still referring to FIGS. 1 and 3B, the melt puddle logic 464 includes one or more programming instructions for fitting the data corresponding to the emissions and/or images resulting from impingement of the beams 151, 152 on a surface to a mathematical expression, identifying states of a melt puddle (e.g., solid, mush, liquid, etc.). That is, the melt puddle logic 464 may include an image analysis algorithm that is configured to convert thermal image data to a matter state identification, a temperature identification, or the like. For instance, the melt puddle logic 464 may identify matter states based on values of the measured emissions 156. Values of emissions 156 may be correlated with matter states based on the composition of the raw material. The correlation may be stored in a memory component (e.g., data storage component 406 of FIG. 4), such as in a lookup table. In some embodiments, the correlation may be calculate based on a conversion function.

Still referring to FIGS. 1 and 3B, the melt planning logic 470 includes one or more programming instructions for determining a size and location of a melt puddle, a time to form a melt puddle, and the like. For example, the melt planning logic 470 may identify a location defined by the x, y, z coordinate axes of FIG. 1 and time periods for forming a melt puddle. In examples, the melt planning logic 470 may determine to conduct calibration after a period of time, length of use of the first electron beam emitter 101 and the second electron beam emitter 102, after completion of one or more layers, or the like. The melt planning logic 470 may select a location and time to form a melt puddle such that one or more factors are given a greater weight or emphasized for optimization or near optimization, such as length of a build, variations of location of calibration, or the like. As such the melt planning logic 470 may determine when and where to execute a calibration process according to specified criteria. The melt planning logic 470 may further determine settings (e.g., power settings for the first electron beam emitter 101 and the second electron beam emitter 102, coordinates for aiming the first electron beam emitter 101 and the second electron beam emitter 102, coordinates for aiming the thermal sensor 116 and/or imaging device 108, etc.), temperature thresholds or targets, and the like for a melt process. The data generated by the melt planning logic 470 may be transmitted, for example, to device interface logic 472 as described herein.

Referring to FIGS. 1, 2A-2D and 3B, the calibration logic 468 includes one or more programming instructions for calibrating the thermal sensor 116 and/or imaging device 108 such that measurements from the thermal sensor 116 and/or imaging device 108 are within a threshold of acceptable deviation. That is, the calibration logic 468 may contain programming instructions for receiving information from the melt puddle logic 464 and/or melt planning logic 470, identifying determining arrest period temperature metrics based on the thermal data and a predetermined phase transition temperature, and determining one or more calibration parameters for thermal sensor 116. In embodiments, the one or more programming instructions for calibrating the thermal sensor 116 and/or imaging device 108 may include transmitting instructions that instruct transmission of one or more calibration parameters to the thermal sensor 116 and/or imaging device 108.

Referring to FIGS. 1- and 3B, in some embodiments, calibrating the thermal sensor 116 and/or the imaging device 108 using the calibration logic 468 may be completed according to a particular melt strategy to be completed. That is, locations of melt puddles, time periods for calibration, or the like may be determined for calibration throughout a melting process. The calibration logic 468 may determine locations of melt puddles, time periods for calibration, or the like before, during, or after calibrating the thermal sensor 116 and/or imaging device 108, and/or before, during, or after forming at least a portion of an additive manufacturing part. As such, the melt planning logic 470 includes programming instructions for determining a programmed movement of the first electron beam emitter 101 and the second electron beam emitter 102, determining a precision mode to be used at particular times for each of the first electron beam emitter 101 and the second electron beam emitter 102, and transmitting instructions to each of the first electron beam emitter 101 and the second electron beam emitter 102 accordingly, as described in greater detail herein.

Referring to FIGS. 1 and 3A-3B, the device interface logic 472 includes one or more programming instructions for establishing communicative connections with the various devices or components of the additive manufacturing system 100. For example, the device interface logic 472 may include programming instructions usable to establish connections with the powder distributor 110, the thermal sensor 116, the imaging device 108, the first electron beam emitter 101 and the second electron beam emitter 102. In another example, the device interface logic 472 may contain programming instructions for working in tandem with the programming instructions of the data receiving logic 460 to establish connections with the thermal sensor 116, the imaging device 108, and other devices.

Referring again to FIG. 3A, the network interface hardware 408 may include any wired or wireless networking hardware, such as a modem, LAN port, wireless fidelity (Wi-Fi) card, WiMax card, long term evolution (LTE) card, mobile communications hardware, and/or other hardware for communicating with other networks and/or devices. For example, the network interface hardware 408 may be used to facilitate communication between external storage devices, user computing devices, server computing devices, external control devices, and/or the like via a network, such as, for example, a local network, the Internet, and/or the like, as described herein with respect to FIG. 4.

Referring to FIGS. 1, 2A-2B, and 3A, the device interface hardware 410 may communicate information between the local interface 400 and one or more components of the additive manufacturing system 100 of FIG. 1, particularly the thermal sensor 116, the imaging device 108, the first electron beam emitter 101, and the second electron beam emitter 102. In some embodiments, the device interface hardware 410 may transmit or receive signals and/or data to/from the powder distributor 110, the thermal sensor 116, the imaging device 108, the first electron beam emitter 101 and the second electron beam emitter 102, and/or other components of the additive manufacturing system 100.

Referring again to FIG. 3A, the data storage component 406, which may generally be a storage medium, may contain one or more data repositories for storing data that is received and/or generated. The data storage component 406 may be any physical storage medium, including, but not limited to, a hard disk drive (HDD), memory, removable storage, and/or the like. While the data storage component 406 is depicted as a local device, it should be understood that the data storage component 406 may be a remote storage device, such as, for example, a server computing device, cloud based storage device, or the like. Illustrative data that may be contained within the data storage component 406 includes, but is not limited to, emission data 422, computed data 424, and/or other data 426. Referring also to FIGS. 1 and 2A-2D, the emission data 422 may generally be data that is generated and/or received as a result of a measurement of emissions from the powder layer 112, and the melt puddle 113, which may result from the electron beams 151, 152 as they impinge on a target area of the powder layer 112. The emission data 422 may be generated by, for example, the thermal sensor 116 and/or imaging device 108. In some embodiments, the emission data 422 may be transmitted by the thermal sensor 116 and/or imaging device 108.

Referring again to FIG. 3A, the computed data 424 may be data that is generated as a result of fitting the shape according to the data corresponding to the electrical response and/or data corresponding to the x-ray response to a mathematical expression, determining a beam spot size, and/or determining whether an interaction occurs upon movement of the first electron beam emitter 101 and the second electron beam emitter 102 (FIG. 1), as described in greater detail herein. Still referring to FIG. 3A, the other data 426 may generally be any other data that is usable for the purposes of calibrating the first electron beam emitter 101 and the second electron beam emitter 102 (FIG. 1), determining a melt strategy, executing the melt strategy, and/or the like, as described herein.

It should be understood that the components illustrated in FIG. 3A are merely illustrative and are not intended to limit the scope of this disclosure. More specifically, while the components in FIG. 3A are illustrated as residing within the analysis component 140, this is a nonlimiting example. In some embodiments, one or more of the components may reside external to the analysis component 140.

Figure 4:
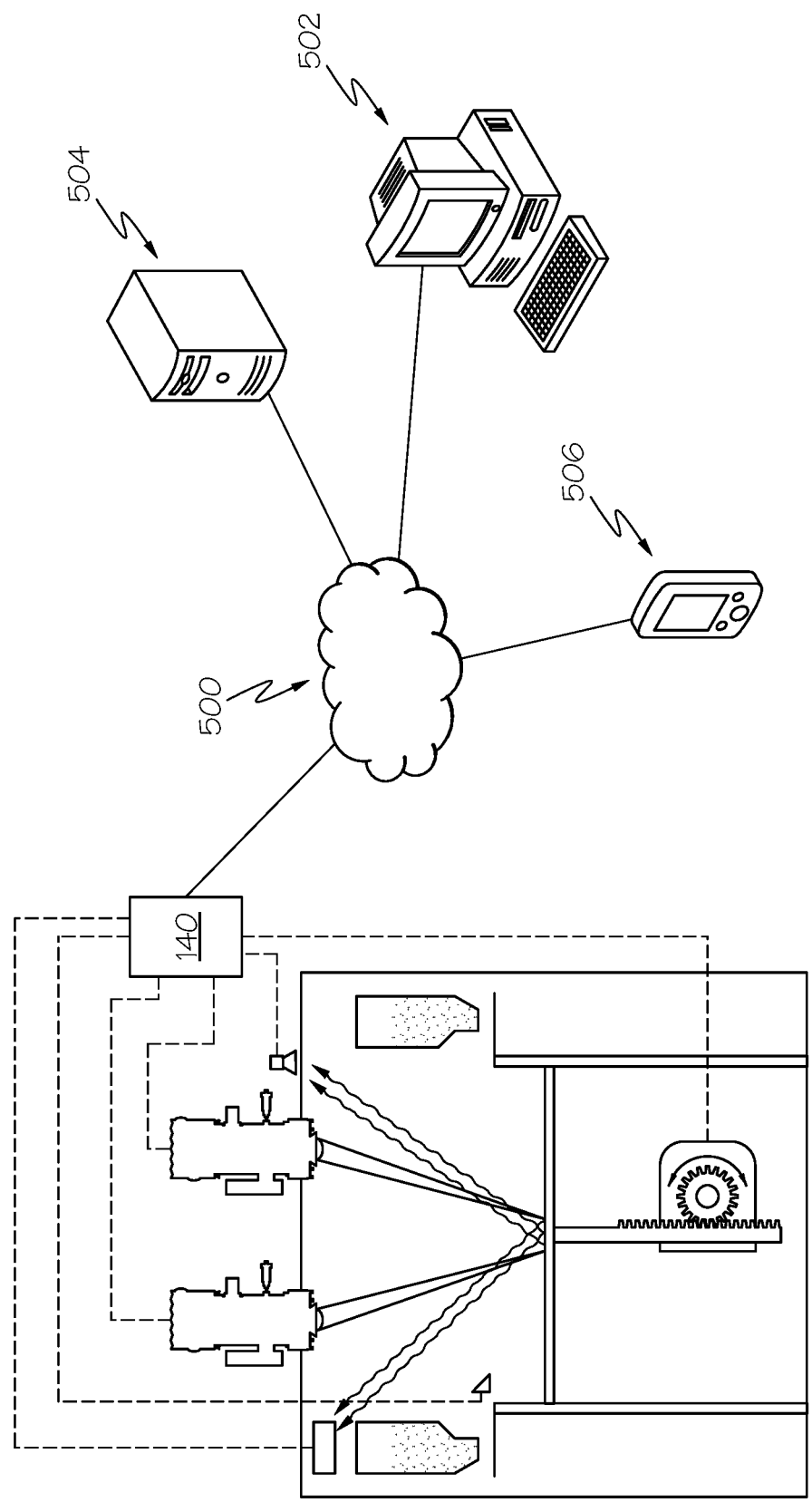
FIG. 4 depicts an illustrative control network according to one or more embodiments shown and described herein.

Referring now to FIG. 4, an illustrative control network 500 is depicted. As illustrated in FIG. 4, the control network 500 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The control network 500 may generally be configured to electronically connect one or more systems and/or devices, such as, for example, computing devices, servers, electronic devices, additive manufacturing systems, and/or components of any of the foregoing. Illustrative systems and/or devices may include, but are not limited to, a user computing device 502, a database server 504, an electronic device 506, and/or the analysis component 140 of the additive manufacturing system 100 of FIG. 1.

Still referring to FIG. 4, the user computing device 502 may generally be used as an interface between a user and the other components connected to the control network 500. Thus, the user computing device 502 may be used to perform one or more user-facing functions, such as receiving one or more inputs from a user or providing information to the user. Accordingly, the user computing device 502 may include at least a display and/or input hardware. In the event that any of the other devices connected to the control network 500 (e.g., the database server 504, the electronic device 506, and/or the analysis component 140), requires oversight, updating, and/or correction, the user computing device 502 may be configured to provide the desired oversight, updating, and/or correction. The user computing device 502 may also be used to input data that is usable to determine a type of material being used for additive manufacture, a number of electron beam emitters to utilize, a desired strategy for forming an article using the additive manufacturing system 100 (e.g., movement strategy), calibration parameters for thermal sensor 116 and/or imaging device 108 (FIG. 1), and/or the like. That is, a user may input information via the user computing device 502 to control various parameters of the additive manufacturing process.

The database server 504 is generally a repository of data that is used for the purposes of calibrating the thermal sensor 116, imaging device 108, and/or employing a particular melt strategy as described herein. That is, the database server 504 may contain one or more storage devices for storing data pertaining to information received from the thermal sensor 116 (FIG. 1), the imaging device 108 (FIG. 1), any generated calculations, and/or the like. In some embodiments, the database server 504 may contain information therein that mirrors the information stored in the data storage component 406 (FIG. 3A) or may be used as an alternative to the data storage component 406 (FIG. 3A), such as an offsite data repository. The database server 504 may be accessible by one or more other devices and/or systems coupled to the control network 500 and may provide the data as needed.

The electronic device 506 may generally be any device that contains hardware that is operable to be used as an interface between a user and the other components of the control network 500. Thus, the electronic device 506 may be used to perform one or more user-facing functions, such as, for example, receiving data one or more external components, displaying information to a user, receiving one or more user inputs, transmitting signals corresponding to the one or more user inputs, and/or the like. While FIG. 4 depicts the electronic device 506 as a smart phone, it should be understood that this is a nonlimiting example. That is, the electronic device 506 may be any mobile phone, a tablet computing device, a personal computing device (e.g., a personal computer), and/or the like.

It should be understood that while the user computing device 502 is depicted as a personal computer, the database server 504 is depicted as a server, and the electronic device 506 is depicted as a mobile device, these are nonlimiting examples. In some embodiments, any type of computing device (e.g., mobile computing device, personal computer, server, cloud-based network of devices, etc.) or specialized electronic device may be used for any of these components. Additionally, while each of these computing devices is illustrated in FIG. 4 as a single piece of hardware, this is also merely an example. Each of the user computing device 502, the database server 504, and the electronic device 506 may represent a plurality of computers, servers, databases, components, and/or the like.

While FIG. 4 depicts the various systems and/or components communicatively coupled to one another via the control network 500, this is merely illustrative. In some embodiments, various components may be communicatively coupled to one another via a direct connection. In some embodiments, various components may be integrated into a single device.

Figure 5:
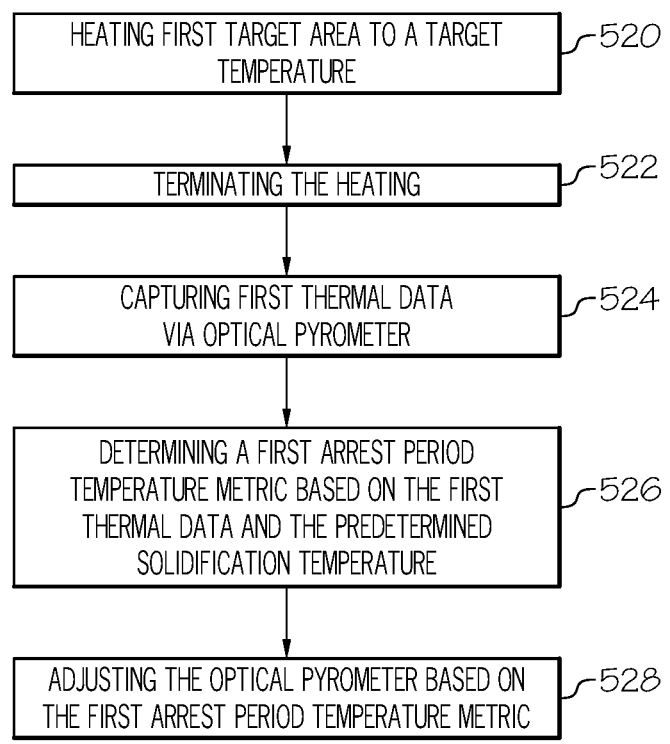
FIG. 5 depicts a flow diagram of an illustrative method of calibrating a thermal sensor in an additive manufacturing system according to one or more embodiments shown and described herein.

FIG. 5 schematically depicts a flow diagram of an illustrative method of calibrating a thermal sensor in an additive manufacturing system 100. While FIG. 5 relates to the calibration of a single optical pyrometer (e.g., thermal sensor 116 of FIG. 1), it should be understood that the processes described with respect to FIG. 5 may be completed for any number of optical pyrometers. In addition, the processes described with respect to FIG. 5 generally relates to processes carried out by the analysis component 140 (FIG. 1). However, it should be understood that other components may be used in addition to, in lieu of, or in conjunction with the analysis component 140 in each of the processes described in FIG. 5 without departing from the scope of the present disclosure.

Referring to FIGS. 1 and 5, block 520 the analysis component 140 may heat a first target area to target temperature. For instance, the analysis component 140 may instruct the first electron beam emitter 101 and/or the second electron beam emitter 102 to activated, and the first electron beam emitter 101 and the second electron beam emitter 102 may activated in response such that the electron beams 151, 152 impinge on a first target area of a raw material of the powder layer 112 disposed on the build platform 114 to a target temperature above a predetermined melting temperature of the raw material. As described herein, the raw material has a predetermined composition and a predetermined melting temperature and a predetermined phase transition temperature. The predetermined melting temperature and the predetermined solidification are generally known for the predetermined composition. Moreover, different compositions of raw material generally have distinct predetermined melting temperature and the predetermined solidification from each other.

The analysis component 140 may identify the first target area based on an x, y, z coordinate of FIG. 1. The target area may be associated with a particular location on a work piece, on a build platform 114, or otherwise within the build chamber 120. The location may be identified based on user input, predetermined locations, based on disbursement of powder layer 112, or a predetermined combination of locations (e.g., general center of the build chamber 120, general corners or boundaries of the build chamber, etc.), The analysis component 140 may identify a size and/or shape for the first target area based on predetermined parameters or dynamically determined parameters.

In some embodiments, the analysis component 140 may heat a second area that is larger than the first target area to second target temperature that is below the predetermined phase transition temperature. For instance, the analysis component 140 instruct the first electron beam emitter 101 and/or the second electron beam emitter 102 to preheat an area surrounding the first target area to a second target temperature that is below the predetermined melting temperature to preheat or presinter the second target area.

At block 522, the first electron beam emitter 101 and/or the second electron beam emitter 102 may terminate the heating. The analysis component 140 may instruct the first electron beam emitter 101 and/or the second electron beam emitter 102 to terminate the heating in response to the first target area forming a first melt puddle. In examples, the first target area may form a melt puddle when it reaches the predetermined melting temperature. As described herein, the analysis component 140 may instruct the first electron beam emitter 101 and/or the second electron beam emitter 102 to terminate heating after receiving measurements from the thermal sensor 116 indicating that the temperature is a target amount above the predetermined melting temperature such that the first target area may be over heated.

At block 524, an optical pyrometer may capture first thermal data. The first thermal data may be measurements of emissions of the first melt puddle as the first melt puddle transitions from a liquid to a solid. As described with reference to FIGS. 2A-2B, the melt puddle 113 may exhibit an arrest period of generally constant temperature. The arrest period may be defined by a start time associated with a first temperature drop rate exceeds a first threshold and an end time associated with a second temperature drop rate exceeding a second threshold. The first temperature drop rate generally exceeds a first threshold just prior to the melt puddle 113 reaching a predetermining melting temperature after heating is terminated (e.g., FIG. 2B). The second temperature drop rate generally exceeds the second threshold as the melt puddle 113 begins to solidify and reaches a predetermined phase transition temperature.

In embodiments, the optical pyrometer may transmit the captured first thermal data to the analysis component 140 (FIG. 1). The analysis component 140 may store the thermal data in a memory component. The thermal data may include emission data associated with readings of the emissivity of the first target area, pixel data defining locations of the readings, and the like. It is noted that the emissivity of the first target area may be based on a state of the raw material (e.g., solid, liquid, powder, etc.). Emissivity is a parameter that tells how much heat radiation is emitted from a hot body. Two bodies with the same temperature can radiate different amount of heat radiation if their emissivity is different. Emissivity is often dependent on the surface structure, so the same material can have different emissivity depending on how the surface is shaped. By utilizing a two wavelength pyrometer to measure the radiation, the emissivity can be cancelled out by calculating the ratio between the signals from the two wavelength bands.

At block 526, the analysis component 140 may determine a first arrest period temperature metric based on the first thermal data and the predetermined phase transition temperature. The first arrest period temperature metric may comprise thermal data measured during the arrest period. For instance, the first arrest period temperature metric may be a calculation of a measurements taken during the arrest period, such as an average of a number of midpoint values measured by the optical pyrometer during the arrest period.

At block 528, the analysis component 140 may adjust the optical pyrometer based on the first arrest period temperature metric. In embodiments, the analysis component may determine one or more calibration parameters from the first thermal data and the predetermined phase transition temperature. The one or more calibration parameters may include adjustments to reference points within the optical pyrometer, adjustments to focusing, or the like. Moreover, the analysis component 140 may transmit one or more instructions to the optical pyrometer in accordance with the one or more calibration parameters, and transmit one or more instructions to the at least one electron beam gun in accordance with the one or more calibration parameters.

According to embodiments, calibration may be iterated for a plurality of target areas of raw material of the powder layer 112 at different locations within the build chamber 120. For instance, calibration may be iterated for a second target area, a third target area, a fourth target area, a fifth target area, and so on. As an example, the method of FIG. 5 may include heating a plurality of target areas of the raw material disposed on the build platform 114 (e.g., a second target area, a third target area, etc.) to the target temperature via the heat source. In response to each of the plurality of target areas forming respective melt puddles (e.g., second melt puddle, third melt puddle, etc.) and/or reaching a threshold temperature above the predetermined melting temperature, the first electron beam emitter 101 and/or the second electron beam emitter 102 may terminate the heating. The optical pyrometer (e.g., thermal sensor 116) may capture respective thermal data (e.g., second thermal data, third thermal data, etc.). In embodiments, the optical pyrometer may transmit the captured respective thermal data (e.g., second thermal data, third thermal data, etc.) to the analysis component 140 (FIG. 1). The analysis component 140 may store the respective thermal data (e.g., second thermal data, third thermal data, etc.) in a memory component. The analysis component 140 may determine respective arrest period temperature metrics (e.g., second arrest period temperature metric, third arrest period temperature metric, etc.) based on the respective thermal data and the predetermined phase transition temperature. The analysis component may adjust the optical pyrometer based on the respective arrest period temperature metrics.

Figure 6:
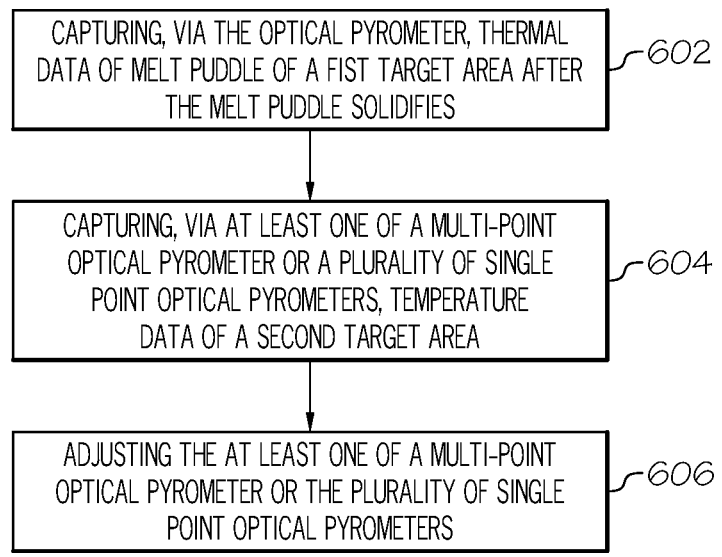
FIG. 6 depicts a flow diagram of an illustrative overview method of calibrating temperature sensors in an additive manufacturing system according to one or more embodiments shown and described herein.

FIG. 6 schematically depicts a flow diagram of an illustrative overview method of calibrating temperature sensors in an additive manufacturing system 100. While FIG. 6 relates to the calibration of a single optical pyrometer (e.g., thermal sensor 116 of FIG. 1), it should be understood that the processes described with respect to FIG. 6 may be completed for any number of optical pyrometers. In addition, the processes described with respect to FIG. 6 generally relate to processes carried out by the analysis component 140 (FIG. 1). However, it should be understood that other components may be used in addition to, in lieu of, or in conjunction with the analysis component 140 in each of the processes described in FIG. 6 without departing from the scope of the present disclosure.

Referring to FIGS. 1 and 6, block 602 an optical pyrometer may capture thermal data after a melt puddle solidifies, where the melt puddles is associated with a first target area. In an embodiment, optical pyrometer is single point optical pyrometer. The optical pyrometer may transmit the captured first thermal data to the analysis component 140 (FIG. 1). The analysis component 140 may store the thermal data in a memory component. The thermal data may include emissivity data associated with readings of the emissivity of the first target area, pixel data defining locations of the readings, and the like. It is noted that the emissivity of the first target area may be based on a state of the raw material (e.g., solid, liquid, powder, etc.).

At block 604, at least one of a multi-point optical pyrometer or a plurality of single point optical pyrometers may capture thermal data of a second target area of raw material that is larger than the first target area. In an embodiment, the thermal sensor 116 (FIG. 1) is a single point pyrometer and the imaging device 108 (FIG. 1) is a multipoint pyrometer or a plurality of pyrometers (e.g., plurality of multipoint pyrometers, plurality of single point pyrometers, etc.) that includes a field of view that is larger than the field of view of a single point pyrometer. In some embodiments, a multipoint pyrometer may include a field of view that substantially encompasses the area of the build platform 114 and/or build chamber 120 (FIG. 1).

At block 606, the analysis component 140 may adjust the at least one of a multi-point optical pyrometer or the plurality of single point optical pyrometers. For instance, the analysis component 140 may adjust the at least one of a multi-point optical pyrometer or the plurality of single point optical pyrometers based on an arrest period temperature metric determined during calibration of the first target area, the thermal data associated with the first target area after cooling, and the thermal data associated with the target area captured by the at least one of a multi-point optical pyrometer or the plurality of single point optical pyrometers. This may, for example, allow an area scan to detect potential areas of contamination, inappropriate powder, or the like.

Again referring to FIGS. 1 and 6, the analysis component 140 determines when the temperature of the melt puddle 113 (FIGS. 2A-2D) drops based on thermal data received from the thermal sensor 116. The imaging device 108 measures and provides thermal data of a larger area of the build platform 114 and/or build chamber 120. The analysis component 140 may calibrate the multipoint pyrometer (e.g., imaging device 108) to measurements from the calibrated single point pyrometer thermal sensor 116, arrest period temperature metrics (e.g., cooling rate, etc.), and/or the predetermined phase transition temperature.

In at least some embodiments, the analysis component 140 may determine arrest period temperature metrics, such as a cooling rate, based on the thermal data received from the thermal sensor 116. The analysis component 140 may analyze the cooling rate during the time when the predetermined phase transition temperature is reached. The cooling rate is generally diminished due to heat of solidification. This predetermined phase transition temperature is a known material property based on the raw material and may be utilized as a temperature reference to which the thermal sensor 116 is calibrated.

Figure 7:
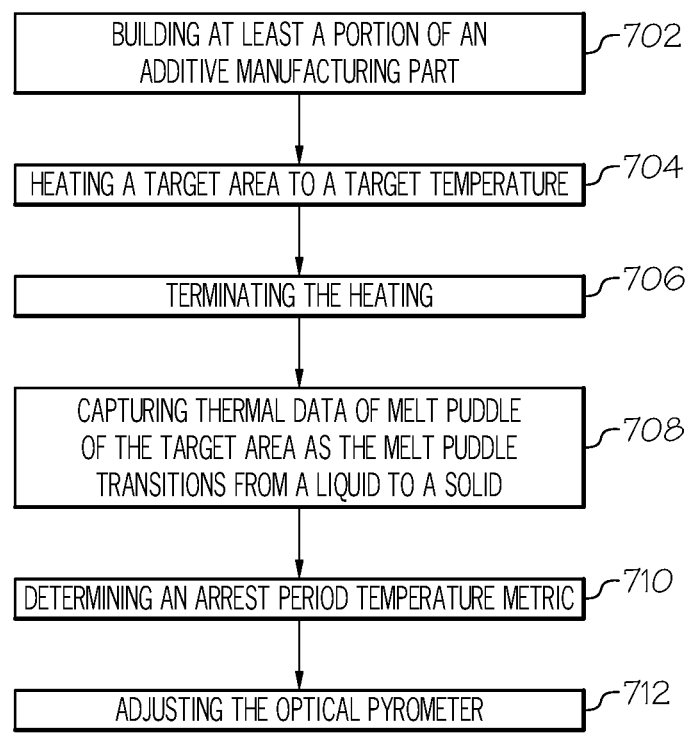
FIG. 7 depicts a flow diagram of an illustrative overview method of iterating calibration temperature sensors in an additive manufacturing system according to one or more embodiments shown and described herein.

FIG. 7 schematically depicts a flow diagram of an illustrative overview method of iterating calibration temperature sensors in an additive manufacturing system 100. While FIG. 7 relates to the calibration of an optical pyrometer (e.g., thermal sensor 116 of FIG. 1) after building a portion of an additive manufacturing part based on a single target area, it should be understood that the processes described with respect to FIG. 7 may be completed for any number of target areas and/or iterated any number of times during a build process. In addition, the processes described with respect to FIG. 7 generally relates to processes carried out by the analysis component 140 (FIG. 1). However, it should be understood that other components may be used in addition to, in lieu of, or in conjunction with the analysis component 140 in each of the processes described in FIG. 7 without departing from the scope of the present disclosure.

Referring to FIGS. 1 and 7, block 702 the additive manufacturing system 100 may build at least a portion of an additive manufacturing part. The additive manufacturing part may be built according to melt planning logic 470 (FIG. 4). The additive manufacturing part can be any appropriate part and can comprise a predetermined raw material. Building of the additive manufacturing part may continue or may be halted for recalibration of the optical pyrometer to account for drift.

At 704, the additive manufacturing system 100 may heat a target area to a target temperature via a heat source, such as the first electron beam emitter 101 and/or the second electron beam emitter 102. It is noted that the additive manufacturing system 100 may heat a plurality of target areas (e.g., a second target area, a third target area, a fourth target area, a fifth target area, and so on). The target area may comprise raw material disposed on the build platform 114. For instance, the analysis component 140 may instruct the first electron beam emitter 101 and/or the second electron beam emitter 102 to activate, and the first electron beam emitter 101 and the second electron beam emitter 102 may activate in response such that the electron beams 151, 152 impinge on a first target area of a raw material of the powder layer 112 disposed on the build platform 114 to a target temperature above a predetermined melting temperature of the raw material. As described herein, the raw material has a predetermined composition and a predetermined melting temperature and a predetermined phase transition temperature.

At block 706, the first electron beam emitter 101 and/or the second electron beam emitter 102 may terminate the heating. The analysis component 140 may instruct the first electron beam emitter 101 and/or the second electron beam emitter 102 to terminate the heating in response to the first target area forming a first melt puddle. In examples, the first target area may form a melt puddle when it reaches a predetermined melting temperature. As described herein, the analysis component 140 may instruct the first electron beam emitter 101 and/or the second electron beam emitter 102 to terminate heating after receiving measurements from the thermal sensor 116 indicating that the temperature is a target amount above the predetermined melting temperature such that the first target area may be over heated.

At block 708, an optical pyrometer may capture thermal data as the melt puddle transitions from a liquid to a solid. As described with reference to FIGS. 2A-2B, the melt puddle 113 may exhibit an arrest period of generally constant temperature. In embodiments, the optical pyrometer may transmit the captured thermal data to the analysis component 140 (FIG. 1). The analysis component 140 may store the thermal data in a memory component.

At block 710, the analysis component 140 may determine an arrest period temperature metric based on the thermal data and the predetermined phase transition temperature. The first arrest period temperature metric may comprise thermal data measured during the arrest period At block 712, the analysis component 140 may adjust the optical pyrometer based on the arrest period temperature metric. In embodiments, the calibration after building at least a portion of an additive manufacturing part may allow for elimination of drift or other factors that may alter accuracy of the optical pyrometer.

It should now be understood that that the devices, systems, and methods described herein allow for calibration of thermal sensors, such as optical pyrometers, for an additive manufacturing system. Using the thermal sensors in conjunction with the various other components described herein, emissivity of a target melt pool of raw material may be measured. Described devices, systems, and methods may utilize known reference points of predetermined melting temperatures and predetermined phase transition temperatures to determined arrest periods and/or arrest period temperature metrics. The arrest period temperature metrics are utilized to determine calibration parameters for thermal sensors, such that measured emissivity is accurate and reliable throughout an additive manufacturing build process.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the present disclosure are provided by the subject matter of the following clauses:

1. A calibration system for an electron beam additive manufacturing system comprising one or more electron beam guns, the calibration system comprising: an optical pyrometer positioned to capture thermal radiation emitted from raw material disposed on a surface within a build chamber of the electron beam additive manufacturing system; and an analysis component communicatively coupled to the optical pyrometer and programmed to: receive first thermal data corresponding to the thermal radiation of a first target area of raw material after the first target area has been heated to a predetermined melting temperature associated with the raw material and at least until the first target area solidifies at a predetermined phase transition temperature associated with the raw material, determine one or more calibration parameters from the first thermal data and the predetermined phase transition temperature, and transmit one or more instructions to the optical pyrometer in accordance with the one or more calibration parameters.

2. The calibration system of any preceding clause, wherein the optical pyrometer comprises a single point optical pyrometer.

3. The calibration system of any preceding clause, wherein the analysis component is further programmed to receive second thermal data associated with the first target area from the optical pyrometer after the first target area solidifies.

4. The calibration system of any preceding clause, further comprising: at least one of a multi-point optical pyrometer or a plurality of single point optical pyrometers communicatively coupled to the analysis component and positioned to capture thermal radiation emitted from a second target area of the raw material that is larger than the first target area; and wherein the analysis component is further programmed to receive second thermal data associated with the thermal radiation emitted from the second target area, and determine one or more second area calibration parameters from the second thermal data and the predetermined phase transition temperature, and transmit one or more second area instructions to the at least one of the multi-point optical pyrometer or the plurality of single point optical pyrometers.

5. The calibration system of any preceding clause, wherein the at least one of the multi-point optical pyrometer or the plurality of single point optical pyrometers are further positioned at locations outside the build chamber of the electron beam additive manufacturing system, the at least one of the multi-point optical pyrometer or the plurality of single point optical pyrometers aimed through a window of the build chamber such that a field of view of the at least one of the multi-point optical pyrometer or the plurality of single point optical pyrometers encompasses the surface within the build chamber.

6. The calibration system of any preceding clause, wherein the optical pyrometer is further positioned to capture thermal radiation emitted from a third target area of the raw material disposed on a build platform within the build chamber and heated to a target temperature at least until the third target area solidifies at the predetermined phase transition temperature, and the analysis component is further programmed to receive third thermal data associated with the thermal radiation emitted from the third target area, determine one or more third area calibration parameters from the third thermal data and the predetermined phase transition temperature, and transmit one or more third target area instructions to the optical pyrometer in accordance with the one or more third target area calibration parameters.

7. The calibration system of any preceding clause, wherein the optical pyrometer is further positioned to capture thermal radiation emitted from a fourth target area of raw material disposed on at least a portion of an additive manufacturing part on a build platform within the build chamber during formation of the additive manufacturing part, and the analysis component is further programmed to receive fourth thermal data associated with the thermal radiation emitted from a fourth target area, determine one or more fourth area calibration parameters from the fourth thermal data and the predetermined phase transition temperature, and transmit one or more fourth target area instructions to the optical pyrometer in accordance with the one or more fourth target area calibration parameters.

8. The calibration system of any preceding clause, wherein the analysis component is further programmed to determine emissivity variation parameters between states of the raw material in the first target area based on the first thermal data, and to determine the one or more calibration parameters from the emissivity variation parameters, the first thermal data, and the predetermined phase transition temperature.

9. The calibration system of any preceding clause, wherein the analysis component is further programed to determine the one or more calibration parameters from the first thermal data and the predetermined phase transition temperature based on averaging temperatures measured during a period defined by a start time associated with a first temperature drop rate exceeding a first threshold and an end time associated with a second temperature drop rate exceeding a second threshold.

10. The calibration system of any preceding clause, wherein the optical pyrometer comprises at least one of a single wavelength band optical pyrometer or a two or more wavelength band optical pyrometer.

11. The calibration system of any preceding clause, further comprising at least one narrow-band optical filter coupled to the optical pyrometer and configured to set measurement wavelengths bands.

12. The calibration system of any preceding clause, wherein the optical pyrometer comprises at least one of a silicon sensor based optical pyrometer, a gallium arsenide sensor based optical pyrometer, or a bolometer.

13. The calibration system of any preceding clause, wherein the analysis component is further programmed to identify foreign material within the raw material based on the first thermal data indicating that the at least one of a melting temperature or a phase transition temperature deviates a threshold amount from at least one of the predetermined melting temperature or the predetermined phase transition temperature.

14. The calibration system of any preceding clause, further comprising at least one area scan camera communicatively coupled to the analysis component, the at least one area scan camera comprising pixels configured to sense radiation in one or more wavelength bands, wherein the pixels may be dynamically adjusted or statically formed by external filters, wherein the analysis component is configured to receive second thermal data corresponding to pixel values from the at least one area scan camera, and measure a relative temperature difference in a field of view of the at least one area scan camera based on the first temperature data and the second temperature data.

15. An electron beam additive manufacturing system, comprising a build chamber; at least one electron beam gun configured to emit an electron beam within the build chamber; and a calibration system comprising: an optical pyrometer positioned to capture thermal radiation emitted from raw material disposed on a surface within the build chamber; and an analysis component communicatively coupled to the optical pyrometer and programmed to receive first thermal data corresponding to the thermal radiation of a first target area of raw material after the first target area has been heated to a predetermined melting temperature associated with the raw material and at least until the first target area solidifies at a predetermined phase transition temperature associated with the raw material, determine one or more calibration parameters from the first thermal data and the predetermined phase transition temperature, transmit one or more instructions to the optical pyrometer in accordance with the one or more calibration parameters, and transmit one or more instructions to the at least one electron beam gun in accordance with the one or more calibration parameters.

16. The electron beam additive manufacturing system of any preceding clause, wherein the analysis component is further programmed to receive second thermal data associated with the first target area from the optical pyrometer after the first target area solidifies, and wherein the one or more instructions to the at least one electron beam gun in accordance with the one or more calibration parameters, comprise an instruction to heat the raw material to a target temperature below the predetermined melting temperature based on measurements from the optical pyrometer according to the one or more calibration parameters.

17. The electron beam additive manufacturing system of any preceding clause, wherein the analysis component is further programed to determine the one or more calibration parameters from the first thermal data and the predetermined phase transition temperature based on averaging temperatures measured during a period defined by a start time associated with a first temperature drop rate exceeding a first threshold and an end time associated with a second temperature drop rate exceeding a second threshold.

18. The electron beam additive manufacturing system of any preceding clause, further comprising at least one imaging device communicatively coupled to the analysis component and configured to measure temperature difference in a field of view of the at least one imaging device, wherein the analysis component is further configured to identify at least one of a potential area of contamination or inappropriate powder.

19. The electron beam additive manufacturing system of claim 18, wherein the at least one imaging device comprises at least one of a silicon sensor based camera, a gallium arsenide sensor based camera, or a multispectral camera comprising a sensitive within a predefined spectral sensitivity.

20. A method of calibrating an additive manufacturing system, the method comprising: heating a first target area of a raw material disposed on a build platform to a target temperature above a predetermined melting temperature of the raw material via a heat source, the raw material having a predetermined composition and a predetermined phase transition temperature; in response to the first target area forming a first melt puddle, terminating the heating; capturing, via an optical pyrometer, first thermal data of the first melt puddle as the first melt puddle transitions from a liquid to a solid; in response to the first melt puddle transforming to a solid, determining a first arrest period temperature metric based on the first thermal data and the predetermined phase transition temperature; and adjusting the optical pyrometer based on the first arrest period temperature metric.

21. The method of any preceding clause, further comprising: capturing, via the optical pyrometer, second thermal data of the first melt puddle after the first melt puddle solidifies, wherein the optical pyrometer is a single point optical pyrometer; capturing, via at least one of a multi-point optical pyrometer or a plurality of single point optical pyrometers, third thermal data of a second target area of raw material that is larger than the first target area; and adjusting the at least one of the multi-point optical pyrometer or the plurality of single point optical pyrometers based on the first arrest period temperature metric, the second thermal data, and the third thermal data.

22. The method of any preceding clause, further comprising: heating a third target area of the raw material disposed on the build platform to the target temperature via the heat source; in response to the third target area forming a second melt puddle, terminating the heating; capturing, via the optical pyrometer, fourth thermal data of the second melt puddle as the second melt puddle transitions from a liquid state to a solid state; in response to the second melt puddle transforming to a solid, determining a second arrest period of the second melt puddle based on the fourth thermal data and the predetermined phase transition temperature; and adjusting the optical pyrometer based on the second arrest period.

23. The method of any preceding clause, further comprising: building at least a portion of an additive manufacturing part on the build platform; heating a fourth target area of the raw material disposed on the build platform to the target temperature via the heat source; in response to the fourth target area forming a third melt puddle, terminating the heating; capturing, via the optical pyrometer, fifth thermal data of the third melt puddle as the third melt puddle transitions from a liquid to a solid; in response to the third melt puddle transforming to a solid, determining a third arrest period of the third melt puddle based on the fifth thermal data and the predetermined phase transition temperature; and adjusting the optical pyrometer based on the third arrest period.

24. The method of any preceding clause, further comprising pre-heating the raw material to a target temperature below the predetermined melting temperature based on measurements from the optical pyrometer according to the first arrest period temperature metric prior to building at least a portion of an additive manufacturing part.

What is claimed is:
1. A calibration system for an electron beam additive manufacturing system comprising one or more electron beam guns, the calibration system comprising:
an optical pyrometer positioned to capture thermal radiation emitted from raw material disposed on a surface within a build chamber of the electron beam additive manufacturing system; and
an analysis component communicatively coupled to the optical pyrometer and programmed to:
receive first thermal data corresponding to the thermal radiation of a first target area of raw material after the first target area has been heated to a predetermined melting temperature associated with the raw material and at least until the first target area solidifies at a predetermined phase transition temperature associated with the raw material, determine one or more calibration parameters from the first thermal data and the predetermined phase transition temperature, transmit one or more instructions to the optical pyrometer in accordance with the one or more calibration parameters, and identify foreign material within the raw material based on the first thermal data indicating that the at least one of a melting temperature or a phase transition temperature deviates a threshold amount from at least one of the predetermined melting temperature or the predetermined phase transition temperature.

2. The calibration system of claim 1, further comprising at least one area scan camera communicatively coupled to the analysis component, the at least one area scan camera comprising pixels configured to sense radiation in one or more wavelength bands, wherein the pixels may be dynamically adjusted or statically formed by external filters, wherein the analysis component is configured to receive second thermal data corresponding to pixel values from the at least one area scan camera, and measure a relative temperature difference in a field of view of the at least one area scan camera based on the first thermal data and the second thermal data.

3. An electron beam additive manufacturing system, comprising:
a build chamber;
at least one electron beam gun configured to emit an electron beam within the build chamber; and
a calibration system comprising:
an optical pyrometer positioned to capture thermal radiation emitted from raw material disposed on a surface within the build chamber; and
an analysis component communicatively coupled to the optical pyrometer and programmed to receive first thermal data corresponding to the thermal radiation of a first target area of raw material after the first target area has been heated to a predetermined melting temperature associated with the raw material and at least until the first target area solidifies at a predetermined phase transition temperature associated with the raw material, determine one or more calibration parameters from the first thermal data and the predetermined phase transition temperature, transmit one or more instructions to the optical pyrometer in accordance with the one or more calibration parameters, transmit one or more instructions to the at least one electron beam gun in accordance with the one or more calibration parameters, and identify foreign material within the raw material based on the first thermal data indicating that the at least one of a melting temperature or a phase transition temperature deviates a threshold amount from at least one of the predetermined melting temperature or the predetermined phase transition temperature.

4. The electron beam additive manufacturing system of claim 3, wherein the analysis component is further programmed to receive second thermal data associated with the first target area from the optical pyrometer after the first target area solidifies, and wherein the one or more instructions to the at least one electron beam gun in accordance with the one or more calibration parameters, comprise an instruction to heat the raw material to a target temperature below the predetermined melting temperature based on measurements from the optical pyrometer according to the one or more calibration parameters.

5. The electron beam additive manufacturing system of claim 3, wherein the analysis component is further programed to determine the one or more calibration parameters from the first thermal data and the predetermined phase transition temperature based on averaging temperatures measured during a period defined by a start time associated with a first temperature drop rate exceeding a first threshold and an end time associated with a second temperature drop rate exceeding a second threshold.

6. The electron beam additive manufacturing system of claim 3, further comprising at least one imaging device communicatively coupled to the analysis component and configured to measure temperature difference in a field of view of the at least one imaging device, wherein the analysis component is further configured to identify at least one of a potential area of contamination or inappropriate powder.

7. The electron beam additive manufacturing system of claim 6, wherein the at least one imaging device comprises at least one of a silicon sensor based camera, a gallium arsenide sensor based camera, or a multispectral camera comprising a sensitivity within a predefined spectral sensitivity.

8. A method of calibrating an additive manufacturing system, the method comprising:
heating a first target area of a raw material disposed on a build platform to a target temperature above a predetermined melting temperature of the raw material via a heat source, the raw material having a predetermined composition and a predetermined phase transition temperature;
in response to the first target area forming a first melt puddle, terminating the heating;
capturing, via an optical pyrometer, first thermal data of the first melt puddle as the first melt puddle transitions from a liquid to a solid;
in response to the first melt puddle transforming to a solid, determining a first arrest period temperature metric based on the first thermal data and the predetermined phase transition temperature;
adjusting the optical pyrometer based on the first arrest period temperature metric; and
identifying foreign material within the raw material based on the first thermal data indicating that the at least one of a melting temperature or a phase transition temperature deviates a threshold amount from at least one of the predetermined melting temperature or the predetermined phase transition temperature.

9. The calibration system of claim 1, wherein the optical pyrometer comprises a single point optical pyrometer.

10. The calibration system of claim 1, wherein the analysis component is further programmed to receive second thermal data associated with the first target area from the optical pyrometer after the first target area solidifies.

11. The calibration system of claim 10, further comprising:
an additional at least one of a multi-point optical pyrometer or an additional plurality of single point optical pyrometers communicatively coupled to the analysis component and positioned to capture thermal radiation emitted from a second target area of the raw material that is larger than the first target area; and
wherein the analysis component is further programmed to receive second thermal data associated with the thermal radiation emitted from the second target area, and determine one or more second area calibration parameters from the second thermal data and the predetermined phase transition temperature, and transmit one or more second area instructions to the at least one of the multi-point optical pyrometer or the plurality of single point optical pyrometers.

12. The calibration system of claim 11, wherein the at least one of the multi-point optical pyrometer or the plurality of single point optical pyrometers are further positioned at locations outside the build chamber of the electron beam additive manufacturing system, the at least one of the multi-point optical pyrometer or the plurality of single point optical pyrometers aimed through a window of the build chamber such that a field of view of the at least one of the multi-point optical pyrometer or the plurality of single point optical pyrometers encompasses the surface within the build chamber.

13. The calibration system of claim 1, wherein:
the optical pyrometer is further positioned to capture thermal radiation emitted from a third target area of the raw material disposed on a build platform within the build chamber after having been heated to a target temperature and at least until the third target area solidifies at the predetermined phase transition temperature, and
the analysis component is further programmed to
receive third thermal data associated with the thermal radiation emitted from the third target area,
determine one or more third area calibration parameters from the third thermal data and the predetermined phase transition temperature, and
transmit one or more third target area instructions to the optical pyrometer in accordance with the one or more third area calibration parameters.

14. The calibration system of claim 1, wherein:
the optical pyrometer is further positioned to capture thermal radiation emitted from a fourth target area of raw material disposed on at least a portion of an additive manufacturing part on a build platform within the build chamber during formation of the additive manufacturing part, and
the analysis component is further programmed to
receive fourth thermal data associated with the thermal radiation emitted from the fourth target area,
determine one or more fourth area calibration parameters from the fourth thermal data and the predetermined phase transition temperature, and
transmit one or more fourth target area instructions to the optical pyrometer in accordance with the one or more fourth area calibration parameters.

15. The calibration system of claim 1, wherein the analysis component is further programmed to determine emissivity variation parameters between states of the raw material in the first target area based on the first thermal data, and to determine the one or more calibration parameters from the emissivity variation parameters, the first thermal data, and the predetermined phase transition temperature.

16. The calibration system of claim 1, wherein the analysis component is further programed to determine the one or more calibration parameters from the first thermal data and the predetermined phase transition temperature based on averaging temperatures measured during a period defined by a start time associated with a first temperature drop rate exceeding a first threshold and an end time associated with a second temperature drop rate exceeding a second threshold.

17. The calibration system of claim 1, wherein the optical pyrometer comprises at least one of a single wavelength band optical pyrometer or a two or more wavelength band optical pyrometer.

18. The calibration system of claim 17, further comprising at least one narrow-band optical filter coupled to the optical pyrometer and configured to set measurement wavelengths bands.

19. The calibration system of claim 1, wherein the optical pyrometer comprises at least one of a silicon sensor based optical pyrometer, a gallium arsenide sensor based optical pyrometer, or a bolometer.

* * * * *